(12) United States Patent
Chuang et al.

(10) Patent No.: US 11,044,479 B2
(45) Date of Patent: Jun. 22, 2021

(54) METHOD OF PALETTE PREDICTOR SIGNALING FOR VIDEO CODING

(71) Applicant: HFI Innovation Inc., Zhubei (TW)

(72) Inventors: Tzu-Der Chuang, Zhubei (TW);
Jungsun Kim, San Jose, CA (US);
Yu-Chen Sun, Keelung (TW);
Wang-Lin Lai, San Jose, CA (US);
Ching-Yeh Chen, Taipei (TW); Jing Ye, San Jose, CA (US); Shan Liu, San Jose, CA (US)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 16/679,650

(22) Filed: Nov. 11, 2019

(65) Prior Publication Data
US 2020/0077095 A1    Mar. 5, 2020

Related U.S. Application Data

(63) Continuation of application No. 15/316,609, filed as application No. PCT/CN2015/081909 on Jun. 19, 2015, now Pat. No. 10,623,747.
(Continued)

(51) Int. Cl.
*H04N 19/593*      (2014.01)
*H04N 19/103*      (2014.01)
(Continued)

(52) U.S. Cl.
CPC ......... *H04N 19/157* (2014.11); *H04N 19/103* (2014.11); *H04N 19/11* (2014.11);
(Continued)

(58) Field of Classification Search
CPC .......................... H04N 19/157; H04N 19/103
See application file for complete search history.

(56) References Cited

U.S. PATENT DOCUMENTS 9,558,567 B2 * 1/2017 Guo ...................... H04N 19/186
9,681,135 B2 * 6/2017 Lai ........................ H04N 19/154
(Continued)

FOREIGN PATENT DOCUMENTS

| CN | 101217668 A | 7/2008 |
|---|---|---|
| WO | 2012/174973 A1 | 12/2012 |

(Continued)

OTHER PUBLICATIONS

International Search Report dated Sep. 29, 2015, issued in application No. PCT/CN2015/081909.
(Continued)

*Primary Examiner* — Irfan Habib
(74) *Attorney, Agent, or Firm* — Oblon, McClelland, Maier & Neustadt, L.L.P.

(57) ABSTRACT

Methods for coding syntax related to palette coding generated in a video coding system are disclosed. According to one embodiment, the current block size checked against the pre-defined block size. If the current block size is larger than the pre-defined block size, a current coding mode is selected from a coding group excluding a palette coding mode. If the current block size is smaller than or equal to the pre-defined block size, the current coding mode is selected from a coding group including the palette coding mode. In another embodiment, if the current block size is greater than a maximum transform size, a current coding mode is selected from a coding group excluding a palette coding mode. If the current block size is smaller than or equal to the maximum transform size, the current coding mode is selected from a coding group including the palette coding mode.

12 Claims, 13 Drawing Sheets

Related U.S. Application Data

(60) Provisional application No. 62/111,140, filed on Feb. 3, 2015, provisional application No. 62/109,836, filed on Jan. 30, 2015, provisional application No. 62/109,830, filed on Jan. 30, 2015, provisional application No. 62/108,165, filed on Jan. 27, 2015, provisional application No. 62/086,319, filed on Dec. 2, 2014, provisional application No. 62/014,959, filed on Jun. 20, 2014.

(51) Int. Cl.
| | | |
|---|---|---|
| *H04N 19/11* | (2014.01) | |
| *H04N 19/122* | (2014.01) | |
| *H04N 19/157* | (2014.01) | |
| *H04N 19/176* | (2014.01) | |
| *H04N 19/426* | (2014.01) | |
| *H04N 19/44* | (2014.01) | |
| *H04N 19/625* | (2014.01) | |

(52) U.S. Cl.
CPC ......... *H04N 19/122* (2014.11); *H04N 19/176* (2014.11); *H04N 19/426* (2014.11); *H04N 19/44* (2014.11); *H04N 19/593* (2014.11); *H04N 19/625* (2014.11)

(56) References Cited

U.S. PATENT DOCUMENTS

| | | | | |
|---|---|---|---|---|
| 9,749,628 | B2* | 8/2017 | Chuang | H04N 19/157 |
| 9,788,004 | B2* | 10/2017 | Sun | H04N 19/593 |
| 9,860,548 | B2* | 1/2018 | Chuang | H04N 19/93 |
| 10,085,026 | B2* | 9/2018 | Hendry | H04N 19/167 |
| 2003/0202602 | A1* | 10/2003 | Apostolopoulos | H04N 19/196 |
| | | | | 375/240.24 |
| 2009/0010533 | A1* | 1/2009 | Hung | H04N 19/182 |
| | | | | 382/166 |
| 2010/0046628 | A1* | 2/2010 | Bhaskaran | H04N 19/103 |
| | | | | 375/240.24 |
| 2011/0311151 | A1 | 12/2011 | Tamatani et al. | |
| 2012/0294353 | A1* | 11/2012 | Fu | H04N 19/176 |
| | | | | 375/240.02 |
| 2012/0314766 | A1* | 12/2012 | Chien | H04N 19/11 |
| | | | | 375/240.12 |
| 2013/0101033 | A1* | 4/2013 | Joshi | H03M 7/3075 |
| | | | | 375/240.12 |
| 2014/0301475 | A1* | 10/2014 | Guo | H04N 19/46 |
| | | | | 375/240.24 |
| 2015/0016501 | A1* | 1/2015 | Guo | H04N 19/93 |
| | | | | 375/240.02 |
| 2015/0078443 | A1* | 3/2015 | Kolesnikov | H04N 19/18 |
| | | | | 375/240.03 |
| 2015/0110181 | A1* | 4/2015 | Saxena | H04N 19/176 |
| | | | | 375/240.12 |
| 2015/0186100 | A1* | 7/2015 | Tsai | H04N 19/593 |
| | | | | 375/240.12 |
| 2016/0057434 | A1* | 2/2016 | Lai | H04N 19/182 |
| | | | | 382/233 |
| 2016/0234494 | A1* | 8/2016 | Seregin | H04N 19/176 |
| 2016/0309172 | A1 | 10/2016 | Laroche et al. | |
| 2018/0041774 | A1* | 2/2018 | Zhu | H04N 19/593 |

FOREIGN PATENT DOCUMENTS

| | | |
|---|---|---|
| WO | 2014/165784 A1 | 10/2014 |
| WO | 2015/006724 A3 | 1/2015 |
| WO | 2015/179810 A1 | 11/2015 |
| WO | 2016/130622 A2 | 8/2016 |

OTHER PUBLICATIONS

Guo, L., et al.; "RCE4: Results of Test 2 on Palette Mode for Screen Content Coding;" Joint Collaborative Team on Video Coding (JCT-VC) of ITU-T SG 16 WP 3 and ISO/IEC JTC 1/SC 29/WG 11:_JCTVC-P0198; Jan. 2014; pp. 1-3

Pu, W., et al.; "Non-RCE4: Refinement of the Palette in RCE4 Test 2," Joint Collaborative Team on Video Coding (JCT-VC) of ITU-T SG 16 WP 3 and ISO/IEC JTC 1/SC 29/WG 11;_JCTVC-P0231; Jan. 2014; pp. 1-4.

Guo, X., et al.; "AHG8: Major-color-based screen content coding;" Joint Collaborative Team on Video Coding (JCT-VC) of ITU-TSG 16 WP 3 and ISO/IEC JTC 1/SC 29/WG 11;_JCTVC-00182; Nov. 2013; pp. 1-10.

Guo, L., et al.; "Non-RCE3: Modified Palette Mode for Screen Content Coding;" Joint Collaborative Team on Video Coding (JCT-VC) of ITU-T SG 16 WP 3 and ISO/IEC JTC 1/SC 29/WG 11; JCTVC-N0249; Aug. 2013; pp. 1-6.

Guo, X., et al.; "RCE4: Test 1. Major-color-based screen content coding;" Joint Collaborative Team on Video Coding (JCT-VC) of ITU-T SG 16 WP 3 and ISO/IEC JTC 1/SC 29/WG 11; JCTVC-P0108; Jan. 2014; pp. 1-12.

Liang, K., et al.; "Variable Block Size Multistage VQ for Video Coding;" IEEE; Nov. 1999; pp. 447-453.

Lai, P.L., et aL; "Description of screen content coding technology proposal by MediaTek;" Joint Collaborative Team on Video Coding (JCT-VC) of ITU-T SG 16 WP3 and ISO/IEC JTC1/SC29/WG11; Mar.-Apr. 2014; pp. 1-31.

Chen, J., et al.; "Description of screen content coding technology proposal by Qualcomm;" Joint Collaborative Team on Video Coding (JCT-VC) of ITU-T SG 16 WP3 and ISO/IEC JTC1/SC29/WG11; Mar.-Apr. 2014; pp. 1-19.

Wang, W., et al.; "Non-CE5: CU dependent color palette maximum size;" Joint Collaborative Team on Video Coding (JCT-VC) of ITU-T SG 16 WP3 and ISO/IEC JTC 1/SC 29/WG 11; Oct. 2014; pp. 1-3.

Gisquet, C., et al., AHG10: Palette Index Coding, Joint Collaborative Team on Video Coding (JCT-VC) of ITU-T SG 16 WP 3 and ISO/IEC JTC 1/SC 29/WG 11, Published on Mar. 27, 2014 in Cesson-Sevigne, France, pp. 1-3.

Jie Zhao, et al., Non-CE6: Simplified palette size coding, Joint Collaborative Team on Video Coding (JCT-VC) of ITU-T SG 16 WP 3 and ISO/IEC JTC 1/SC 29/WG 11, Published on Oct. 17, 2014 in Camas, WA, USA, pp. 1-5.

Wei Wang, et al., Non-CE6: 2-D Index Map Coding of Palette Mode in HEVC SCC, Joint Collaborative Team on Video Coding (JCT-VC) of ITU-T SG 16 WP 3 and ISO/IEC JTC 1/SC 29/WG 11, Published on Oct. 17, 2014 in Santa Clara, USA, pp. 1-6.

\* cited by examiner

| (20,0,0) 0 ⬇ 0 | (20,0,0) 0 ⬇ 0 | (20,0,0) 0 | (20,0,0) 0 | (200,0,0) N | (200,0,0) N | (200,0,0) N | (200,0,0) N |
|---|---|---|---|---|---|---|---|
| | | | | | | | |
| | | | | | | | |
| | | | | | | | |
| | | | | | | | |
| | | | | | | | |
| | | | | | | | |

| (20,0,0) 0 ⇩ | (20,0,0) 0 ⇩ | (20,0,0) 0 | (20,0,0) 0 | (200,0,0) N | (200,0,0) N | (200,0,0) N | (200,0,0) N |
|---|---|---|---|---|---|---|---|
| (20,0,0) 0 | (20,0,0) 0 | | | | | | |
| | | | | | | | |
| | | | | | | | |
| | | | | | | | |
| | | | | | | | |
| | | | | | | | |
| | | | | | | | |

Fig. 5

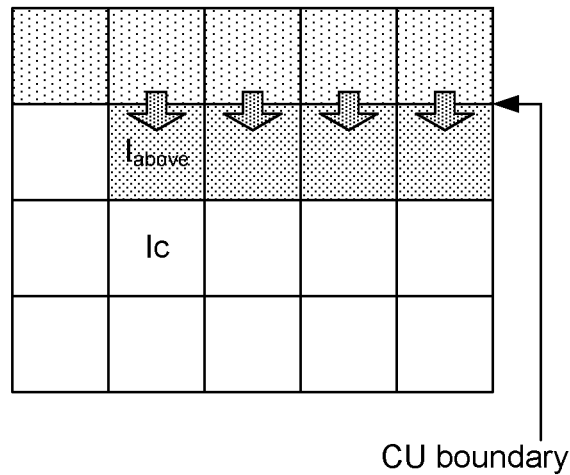
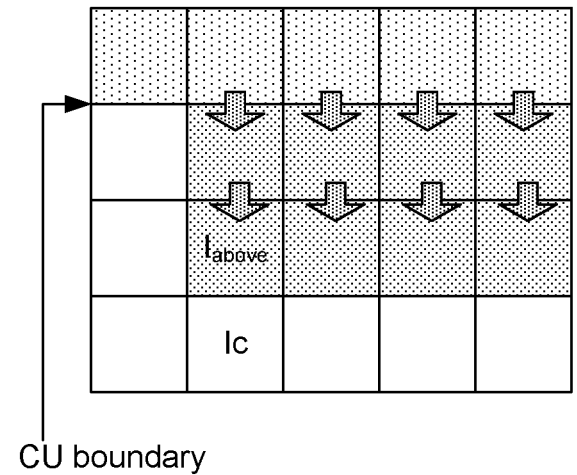
Fig. 9A Fig. 9B
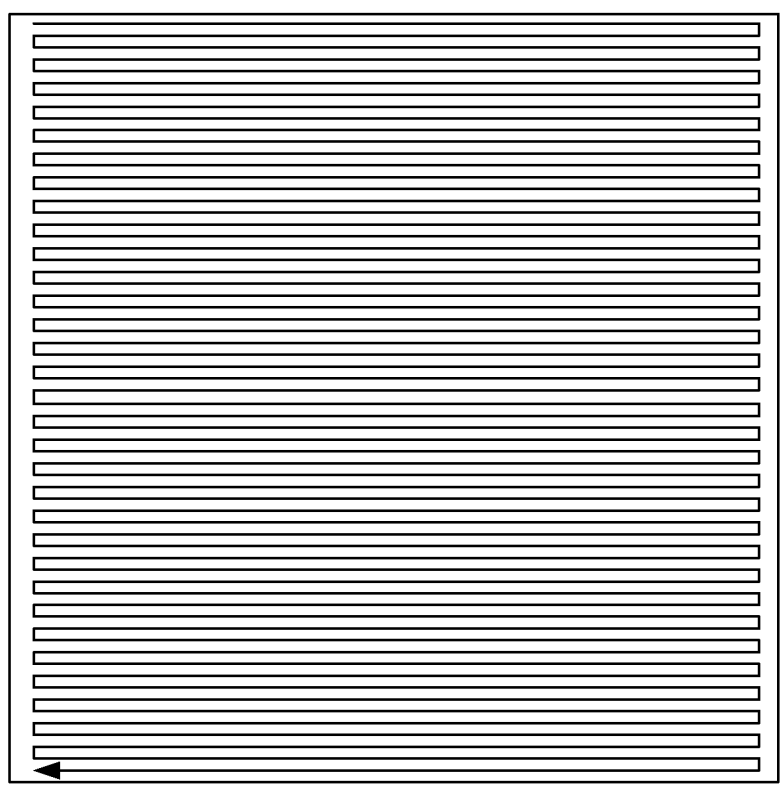
Fig. 10

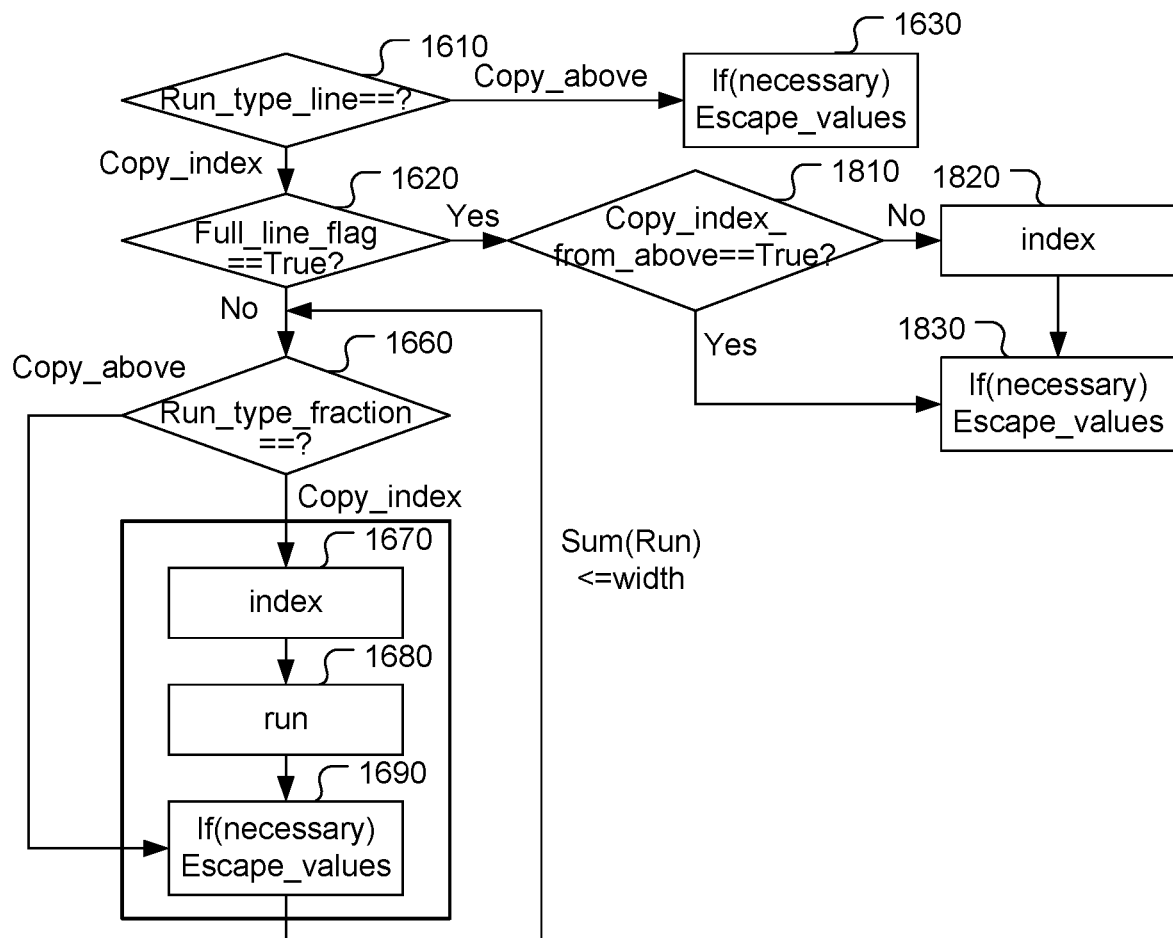
Fig. 18
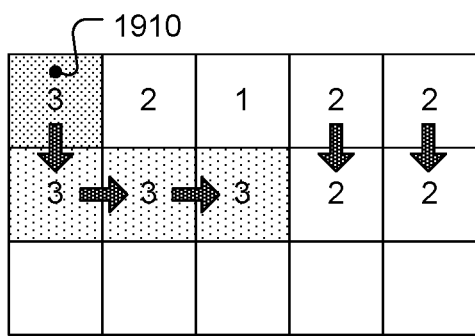
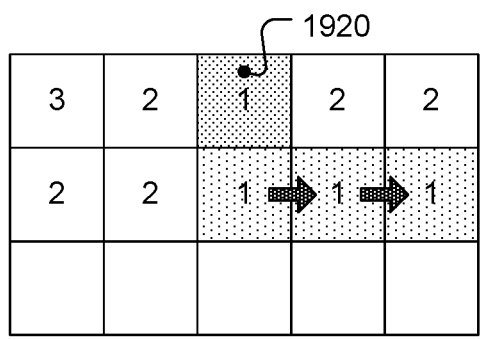
Fig. 19A            Fig. 19B

METHOD OF PALETTE PREDICTOR SIGNALING FOR VIDEO CODING

CROSS REFERENCE TO RELATED APPLICATIONS

The present invention claims priority to U.S. Provisional Patent Application Ser. No. 62/014,959, filed on Jun. 20, 2014, U.S. Provisional Patent Application Ser. No. 62/086,319, filed on Dec. 2, 2014, U.S. Provisional Patent Application Ser. No. 62/108,165, filed on Jan. 27, 2015,U.S. Provisional Patent Application Ser. No. 62/109,830, filed on Jan. 30, 2015, U.S. Provisional Patent Application Ser. No. 62/109,836, filed on Jan. 30, 2015, and U.S. Provisional Patent Application Ser. No. 62/111,140, filed on Feb. 3, 2015.The U.S. Provisional Patent Applications are hereby incorporated by reference in their entireties.

TECHNICAL FIELD

The present invention relates to palette coding for video data. In particular, the present invention relates to various techniques including palette size signaling to improve coding efficiency, restricting maximum coding unit size to reduce system complexity, simplified context-adaptive coding for run type, and simplified redundancy removal in palette coding.

BACKGROUND

High Efficiency Video Coding (HEVC) is a new coding standard that has been developed in recent years. In the High Efficiency Video Coding (HEVC) system, the fixed-size macro block of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Several coding tools for screen content coding have been developed. These tools related to the present invention are briefly reviewed as follow.

Palette Coding

During the development of HEVC range extensions (RExt), several proposals have been disclosed to address palette-based coding. For example, a palette prediction and sharing technique is disclosed in JCTVC-N0247 (Guo et al., "RCE3: Results of Test 3.1 on Palette Mode for Screen Content Coding", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247) and JCTVC-O0218 (Guo et al., "Evaluation of Palette Mode Coding on HM-12.0+RExt-4.1", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0218). In JCTVC-N0247 and JCTVC-O0218, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table (also called palette table) size is first transmitted followed by the palette elements (i.e., color values).
2. Transmission of pixel values: the pixels in the CU are encoded in a raster scan order. For each group of one or more pixels, a flag for a run-based mode is first transmitted to indicate whether the "copy index mode" or "copy above mode" is being used.
2.1 "Copy index mode": In the copy index mode, a palette index is first signaled followed by "palette_run"(e.g., M) representing the run value. The term palette run may also be referred as pixel_run in this disclosure. The run value indicates that a total of M samples are all coded using copy index mode. No further information needs to be transmitted for the current position and the following M positions since they have the same palette index as that signaled in the bitstream. The palette index (e.g., i) may also be shared by all three color components, which means that the reconstructed pixel values are (Y, U, V)=(palette$_Y$[i], palette$_U$[i], palette$_V$[i]) for the case of YUV color space.
2.2 "Copy above mode": In the copy above mode, a value "copy_run" (e.g. N) is transmitted to indicate that for the following N positions (including the current one), the palette index is the same as the corresponding palette index in the row above.
3. Transmission of residue: the palette indices transmitted in Stage 2 are converted back to pixel values and used as the prediction. Residue information is transmitted using HEVC residual coding and is added to the prediction for the reconstruction.

Both "copy index mode" and "copy above mode" are referred as copy modes for palette index coding in this disclosure. Besides, the palette mode is also referred to as palette coding mode in the following descriptions.

In JCTVC-N0247, palette of each component are constructed and transmitted. The palette can be predicted (shared) from its left neighboring CU to reduce the bitrate. In JCTVC-O0218, each element in the palette is a triplet, which represents a specific combination of the three color components. Furthermore, the predictive coding of palette across CU is removed.

Another palette coding technique similar to JCTVC-O0218 has also been disclosed. Instead of predicting the entire palette table from the left CU, individual palette color entry in a palette is predicted from the exact corresponding palette color entry in the above CU or left CU.

For transmission of pixel palette index values, a predictive coding method is applied on the indices as disclosed in JCTVC-O0182 (Guo et al., "AHG8: Major-color-based screen content coding", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). Three types of line modes, i.e., horizontal mode, vertical mode and normal mode are used for coding each index line. In the horizontal mode, all the indices in the same line have the same value. If the value is the same as the first pixel of the above pixel line, only line mode signaling bits are transmitted. Otherwise, the index value is also transmitted. In the vertical mode, it indicates that the current index line is the same with the above index line. Therefore, only line mode signaling bits are transmitted. In normal mode, indices in a line are predicted individually. For each index position, the left or above neighbors is used as a predictor, and the prediction symbol is transmitted to the decoder.

Furthermore, pixels are classified into major color pixels (with palette indices pointing to the palette colors) and escape pixel according to JCTVC-O0182. For major color pixels, the pixel value is reconstructed according to the major color index (i.e., palette index) and palette table in the decoder side. For escape pixel, the pixel value is further signaled in the bitstream.

Palette Table Signaling

In the reference software of screen content coding (SCC) standard, SCM-2.0 (Joshi et al., *Screen content coding test model 2* (*SCM 2*), Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R1014), an improved palette scheme is integrated in JCTVC-R0348 (Onno, et al., *Suggested combined software and text for run-based palette mode,* Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R0348). The palette table of previous palette-coded CU is used as a predictor for current palette table coding. In palette table coding, the current palette table is signaled by choosing which palette colors in the previous coded palette table (palette predictor)are reused, or by transmitting new palette colors. The size of the current palette is set as the size of the predicted palette (i.e., numPredPreviousPalette) plus the size of the transmitted palette (i.e., num_signalled_palette_entries). The predicted palette is a palette derived from the previously reconstructed palette coded CUs. When coding the current CU as a palette mode, those palette colors that are not predicted using the predicted palette are directly transmitted in the bitstream (i.e., signaled entries).

An example of palette updating is shown as follows. In this example, the current CU is coded as palette mode with a palette size equal to six. Three of the six major colors are predicted from the palette predictor (numPredPreviousPalette=3) and three are directly transmitted through the bitstream. The transmitted three colors can be signaled using the exemplary syntax shown below.

num_signalled_palette_entries=3
for (cIdx=0; cIdx<3; cIdx++)//signal colors for different components
for (i=0; i<num_signalled_palette_entries; i++)
palette_entries[cIdx][numPredPreviousPalette+i]

Since the palette size is six in this example, the palette indices from 0 to 5 are used to indicate the major color entries in the palette color table. The 3 predicted palette colors are represented with indices 0 to 2. Accordingly, three new palette entries are transmitted for indexes 3 through 5.

In SCM-2.0, if the wavefront parallel processing (WPP) is not applied, the palette predictor table is initialized (reset) at the beginning of each slice or at the beginning of each tile. If the WPP is applied, the last coded palette table is not only initialized (reset) at the beginning of each slice or at the beginning of each tile, but also initialized (reset) at the beginning of each CTU row.

Wavefront Parallel Processing (WPP)

In HEVC, WPP is supported, where each row of Coding Tree Units (CTUs) can be processed in parallel as substreams by multiple encoding or decoding threads. In order to limit the degradation of coding efficiency, a wavefront pattern of processing order ensures that dependencies on spatial neighbors are not changed. On the other hand, at the start of each CTU row, the CABAC states are initialized based on the CABAC states of the synchronization point in upper CTU row. For example, the synchronization point can be the last CU of the second CTU from the upper CTU row as shown in FIG. 1, where the parallel processing is applied to CTU rows. Furthermore, it is assumed in this example that the palette coding of each current CTU (marked as "X" in FIG. 1) depends on its left, above-left, above and above-right CTUs. For the top CTU row, the palette processing is dependent on the left CTU only. Moreover, CABAC engine is flushed at the end of each CTU row and byte alignment is enforced at the end of each sub-stream. The entry points of WPP sub-streams are signaled as byte offsets in the slice header of the slice that contains the wavefront.

In FIG. 1, each block stands for one CTU and there are four CTU rows in a picture. Each CTU row forms a wavefront sub-stream that can be processed independently by an encoding or a decoding thread. The "X" symbols represent the current CTU under processing for the multiple threads. Since a current CTU has dependency on the above-right CTU, the processing of the current CTU has to wait for the completion of the above-right CTU. Therefore, there must be two CTUs delay between two processing threads of neighboring CTU rows so that the data dependency (e.g. spatial pixels and motion vectors (MVs)) can be preserved. In addition, the CABAC states of the first CTU of each CTU row is initialized with the states obtained after the second CTU of the upper CTU row is processed. For example, the first CU (indicated by "p1") of the first CTU in the second CTU row is initialized after the last CU (indicated by "p2") in second CTU of the above CTU row is processed. The dependency is indicated by a curved arrow line pointing from "p1" to "p2". Similar dependency for the first CTU of each CTU row is indicated by the curved arrows. This allows for a quicker learning of the probabilities along the first column of CTUs than using the slice initialization states for each CTU row. Since the second CTU of the upper CTU row is always available to the current CTU row, parallel processing can be achieved using this wavefront structure. For each current CTU, the processing depends on the left CTU. Therefore, it has to wait until the last CU of the left CTU is processed. As shown in FIG. 1, a first CU (indicated by "p3") in a current CTU has to wait for the last CU (indicated by "p4") of the left CTU to finish. Again, the dependency is indicated by a curved arrow line pointing from "p3" to "p4". Similar dependency on the left CTU is indicated by curved arrows for the CTU being process (indicated by "X").

Intra Block Copy

A new Intra coding mode, named Intra-block copy (IntraBC) has been used. The IntraBC technique that was originally proposed by Budagavi in *AHG8: Video coding using Intra motion compensation,* Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 2, where a current coding unit (CU, 210) is coded using Intra MC (motion compensation). The prediction block (220) is located from the current CU and a displacement vector (212). In this example, the search area is limited to the current CTU (coding tree unit), the left CTU and the left-left CTU. The prediction block is obtained from the already reconstructed region. Then, the displacement vector (i.e., MV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transform (such as discrete cosine transform (DCT)).

In JCTVC-M0350, the Intra MC is different from the motion compensation used for Inter prediction in at least the following areas:

MVs are restricted to be 1-D for Intra MC (i.e., either horizontal or vertical) while Inter prediction uses 2-D motion estimation. The MVs are also referred to as block vectors (BVs) for Intra copy prediction.

Binarization is fixed length for Intra MC while Inter prediction uses exponential-Golomb.

Intra MC introduces a new syntax element to signal whether the MV is horizontal or vertical.

Based on JCTVC-M0350, some modifications are disclosed by Pang, et al. in *Non-RCE*3: *Intra Motion Compensation with 2-D MVs,* Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-N0256, two MV coding methods were disclosed:

Method 1—Motion vector prediction. The left or above MV is selected as the MV predictor and the resulting motion vector difference (MVD) is coded. A flag is used to indicate whether the MVD is zero. When MVD is not zero, exponential-Golomb codes of the 3rd order are used to code the remaining absolute level of the MVD. Another flag is used to code the sign.

Method 2: NoMotion vector prediction. The MV is coded using the exponential-Golomb codes that are used for MVD in HEVC.

Another difference disclosed in JCTVC-N0256 is that the 2-D Intra MC is further combined with the pipeline friendly approach:

1. No interpolation filters are used,
2. MV search area is restricted. Two cases are disclosed:
a. Search area is the current CTU and the left CTU or
b. Search area is the current CTU and the rightmost 4 column samples of the left CTU.

Among the proposed methods in JCTVC-N0256, the 2-D Intra MC, the removal of interpolation filters, and the search area constraint to the current CTU and the left CTU have been adopted in a new version draft standard. The CU level syntax corresponding to JCTVC-N0256 has been incorporated in *High Efficiency Video Coding* (*HEVC*) *Range Extension text specification: Draft* 4 (*RExt Draft* 4) (Flynn, et al., Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N1005).

Furthermore, full-frame IntraBC has been disclosed in JCTVC-Q0031 (*Draft text of screen content coding technology proposal by Qualcomm,* Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 April 2014, Document: JCTVC-Q0031) and JCTVC-Q0035 (*Description of screen content coding technology proposal by Microsoft,* Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 Apr. 2014, Document: JCTVC-Q0035). Full-frame IntraBC removes the search area constraints to further improve the coding efficiency of IntraBC. Therefore, all of the reconstructed blocks can be referenced by current CU, which introduces the data dependency between current CU and all of previous coded CUs. While full-frame IntraBC outperform the original IntraBC, the data dependency prevents from the use of parallel processing during the decoding process, especially for enabling tile process or wavefront parallel process (WPP) in HEVC.

Palette Index Map Scan Order

In SCM-2.0 palette mode coding, the traverse scan is used for index map coding as shown in FIG. 3. FIG. 3 shows a traverse scan for an 8×8 block. In traverse scan, the scan for even rows is from left to right, and the scan for odd rows is from right to left when the scanning order is horizontal. The traverse scan can also be applied in the vertical direction, where the scan is from top to bottom for even columns and from bottom to top for odd columns. The traverse scan is applied for all block sizes in palette mode.

It is desirable to develop methods for further improving the coding efficiency or lower the complexity for syntax elements generated in the palette mode.

SUMMARY

Methods for improving the coding efficiency or lower the complexity for syntax related to palette coding generated in a video coding system are disclosed. According to one embodiment of the present invention, the current block size is checked against the pre-defined block size. If the current block size is larger than the pre-defined block size, a current coding mode is selected from a first coding group excluding a palette coding mode. If the current block size is equal to or smaller than the pre-defined block size, the current coding mode is selected from a second coding group including the palette coding modes. The current block is then encoded or decoded according to the current coding mode selected. The pre-defined block size may correspond to 32×32 or the maximum transform unit size. A palette mode flag can be inferred to be zero to indicate no palette coding mode being used for the current coding unit if the current block size is larger than the pre-defined block size. The palette mode flag may also be restricted to be zero to indicate no palette coding mode being used for the current coding unit instead of being transmitted explicitly. In one embodiment, if the palette mode flag indicates that the palette coding mode being used for the current coding unit and the current coding unit is larger than the pre-defined block size, the current coding unit is divided into multiple blocks that size equal to pre-defined block size and each block is coded by the palette coding mode. Each block may use individual palette coding syntax.

In yet another embodiment, a palette related size is coded more efficiently using a code including the Kth order Exp-Golomb code. The palette related size may correspond to a reused major color size representing a first number of major colors in the current palette table that reuse the major colors in the palette predictor, a new major color size representing a second number of major colors in the current palette table not predicted by the palette predictor, or a total major color size representing a third number of major colors present in the current block. The palette related size may correspond to the combination of the reused major color size, the new major color size and the total major color size. The palette related size is binarizing to generate a binarized palette related size according to one Kth order Exp-Golomb code, one Kth order Exp-Golomb code plus one unary code, or one Kth order Exp-Golomb code plus one truncated unary code. Entropy coding is then applied to the binarized palette related size to generate a coded palette related size. K may correspond to 0, 1, 2 or 3. The maximum number of bits of said one truncated unary code corresponds to 1, 2 or 3. A part of bins of the binarized palette related size can be coded using context adaptive coding. If the palette related size corresponds to the reused major color size, first N bits corresponding to first N reuse flags can be encoded to reduce the first number of major colors in the current palette, where N is a positive integer. Furthermore, binarizing the palette related size to generate the binarized palette related size can be performed adaptively according to a maximum possible palette size. Similar process for the decoder side is also disclosed.

In yet another embodiment, context-adaptive coding with a single context is used to code the palette run type. If a current pixel is coded in a copy mode, the palette run type for the current pixel is determined, where the palette run type corresponds to either a copy-above mode or a copy-index mode. The palette run type is then encoded using context adaptive entropy coding with a single context without dependency on any previously coded palette run type associated with any previously coded pixel located above the current pixel. Similar process for the decoder side is also disclosed.

In yet another embodiment, redundant index removal is performed adaptively depending on the copy mode corresponding to a previous pixel in the scanning order. If the previous pixel is copy-index mode, a redundant index corresponding to previous-pixel index is removed from the palette set to form an updated palette set. If the previous pixel is copy-above mode, redundant index removal is skipped and the palette set is used as the updated palette set without redundancy removal. The current index of the current pixel is encoded or decoded according to the updated palette set.

BRIEF DESCRIPTION OF DRAWINGS

FIG. 5 illustrates an example of copy above mode, where not only the indices of consecutive pixels but also the pixel values are copied from the pixels located in the above row.

FIG. 9A illustrates an example that index $I_{above}$ is directly copied from the above pixels in the neighboring coding unit.

FIG. 9B illustrates an example that $I_{above}$ is copied from an above pixel, where the index of the above pixel in turn is copied from the above pixels in the neighboring coding unit.

FIG. 10 illustrates a horizontal traverse scan for a 64×64 block, where the scan for even rows is from left to right and the scan for odd rows is from right to left.

FIG. 18 illustrates another exemplary flowchart of syntax parsing incorporating the syntax design according to an embodiment of the present invention.

FIG. 19A illustrates an example of using a flag to indicate that the index is same as the one above instead of signaling index itself, where the flag indicates that index "3" from the pixel above.

FIG. 19B illustrates an example of using a flag to indicate that the index is same as the one above instead of signaling index itself, where the flag indicates that index "1" from the pixel above.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention is directed to several aspects related to palette coding disclosed as follows.

Palette Size Signaling

In JCTVC-O0218, the encoder will first encode reused flags to indicate the number of major colors in the palette predictor reused. A new major color size is then coded to indicate the number of new major colors to be signaled. The number of new major color size is coded using a unary code or truncated unary code. In JCTVC-O0182, the number of total major color size is coded using a fixed-length code.

However, the binarization methods of unary code, truncated unary code, and fixed-length code are not efficient. Therefore, Kth order Exp-Golomb code, truncated Kth order Exp-Golomb code, unary code plus Kth order Exp-Golomb code, or truncated unary code plus Kth order Exp-Golomb code is used according to an embodiment of the present invention for the binarization of the palette related size such as the number of new major color size, the number of reused major color size in the palette predictor, the total major color size, or any combination thereof.

For example, the binarization may use a truncated unary (TU) code with a maximum length of 3 bits plus an Kth order Exp-Golomb code with K equal to 3 (i.e., EG-3 code) as shown in Table 1.

TABLE 1

| Size | Codeword |
|------|----------|
| 0 | 0 |
| 1 | 10 |
| 2 | 110 |
| >=3 | 111 + $3^{rd}$ order Exp-Golomb (size − 3) |

While K is equal to 3 in the example of Table 1, K can be 0, 1, 2, 3, or 4 according to embodiments of the present invention. On the other hand, the maximum length of the TU code can be 1, 2, or 3 according to embodiments of the present invention. A part of the bins of the binarized palette related size can be coded with contexts. For example, the first three bins can be coded with contexts.

The number of major color size can be divided by M for coding. For example, if the major color size is 17, M is 4, the coded size is ceil(17/4)=5, where ceil( ) corresponds to the ceiling function.

Some of the reuse flags in the predictor can be always directly coded. For example, the first N (e.g. 4) bits corresponding to the first N reuse flags can be directly coded instead of run-length coded. Therefore, the number of reuse flags can be decreased.

The binarized codeword can be adaptively changed according to the maximum possible size. For example, if the maximum size is 3, 3 bits for the TU code will be adequate. In this case, there is no need for the EG-K code and the EG-K part can be skipped.

Prediction from Above Pixels or Neighboring CU Pixels (NCPs)

Figure 1:
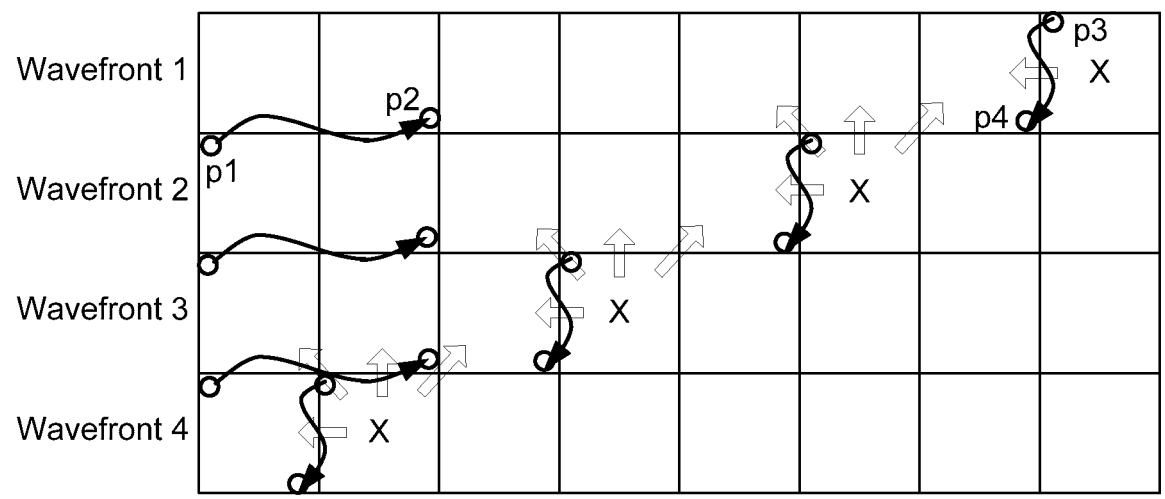
FIG. 1 illustrates an exemplary wavefront parallel processing (WPP) with 4 coding tree unit (CTU) rows.
Figure 2:
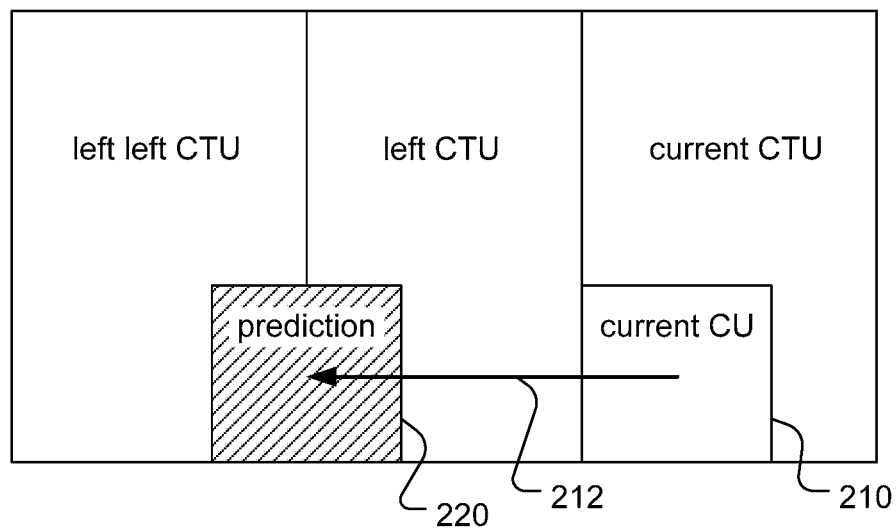
FIG. 2 illustrates an exemplary Intra Block Copy (IntraBC) coding mode for screen content coding (SCC).
Figures 3, 4:
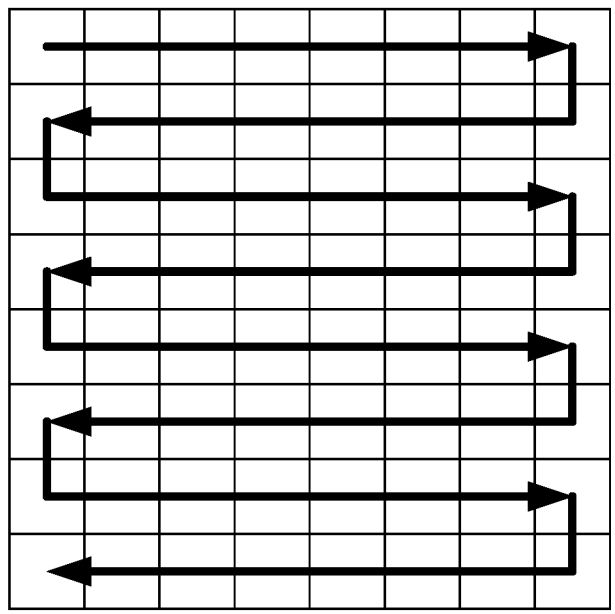
FIG. 3 illustrates a horizontal traverse scan for an 8×8 block, where the scan for even rows is from left to right and the scan for odd rows is from right to left.
FIG. 4 illustrates an example of copy above mode, where the indices of consecutive pixels are copied from the indices of pixels located in the above row.

In SCM 2.0, when a pixel is signaled by a copy_run syntax, it will copy the above pixel's index value and use the index value, as shown in FIG. 4. The reconstructed pixel values will be derived from the palette shown in Table 2.

TABLE 2

| Color Index | Pixel Value |
|-------------|-------------|
| 0 | (20, 0, 0) |
| 1 | (200, 0, 0) |

According to an embodiment of the present invention, when a pixel is coded by signaling a copy_run syntax, the pixel will copy not only the above pixel's pixel index but also the above pixel's pixel value as shown in FIG. 5. The decoder can reconstruct the pixel in the copy_run mode from the copied pixel value without referring to the palette.

According to another embodiment, a special symbol (e.g. "A") can be assigned to all positions covered by copy_run (copy above) during the parsing stage. Then, in the reconstruction stage, whenever the decoder encounters an "A", it copies the pixel value from above.

Also, pixel values for index_run can be directly signaled without the associated index. In this case, the palette table and other information related to the palette table do not need to be coded.

Figure 6:
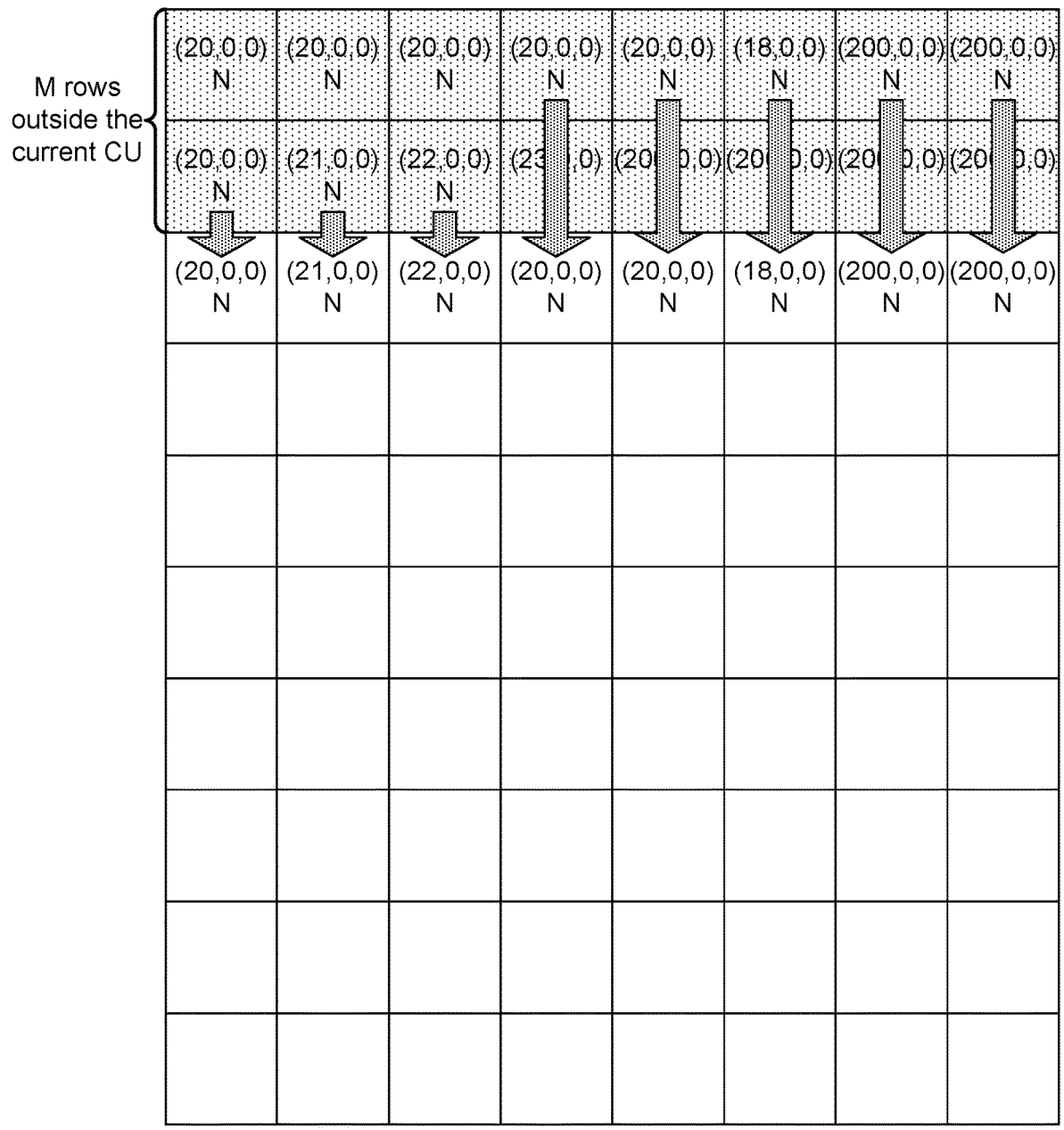
FIG. 6 illustrates an example of copy above mode for copying pixels across coding unit (CU) by assigning a special index value (i.e. N) to indicate the index value is copied across the coding unit (CU).

If the above pixels are from another CU across the CU boundary, an embodiment according to the present invention assigns a special index for the neighboring CU pixel (NCP), denoted as N. When a pixel is signaled by a copy_run syntax, it will copy not only the pixel index (N) of the pixel above but also the pixel value of the pixel above, as shown in FIG. 6. The special value, N, can be a value different from all possible index value (e.g. the maximum index value+1).

If the prediction is from a left NCP, the similar method can be applied and the NCPs in the case will be the left NCPs.

Padding Indices and Pixel Values of NCPs

If the above CU is invalid, the decoder can substitute the indices and pixel values of the above NCPs with a predefined or derived value. The substitution method can also be applied to the case of copying index (e.g. FIG. 4), copying values, and copying both index and values (e.g. FIG. 5).

Figure 7:
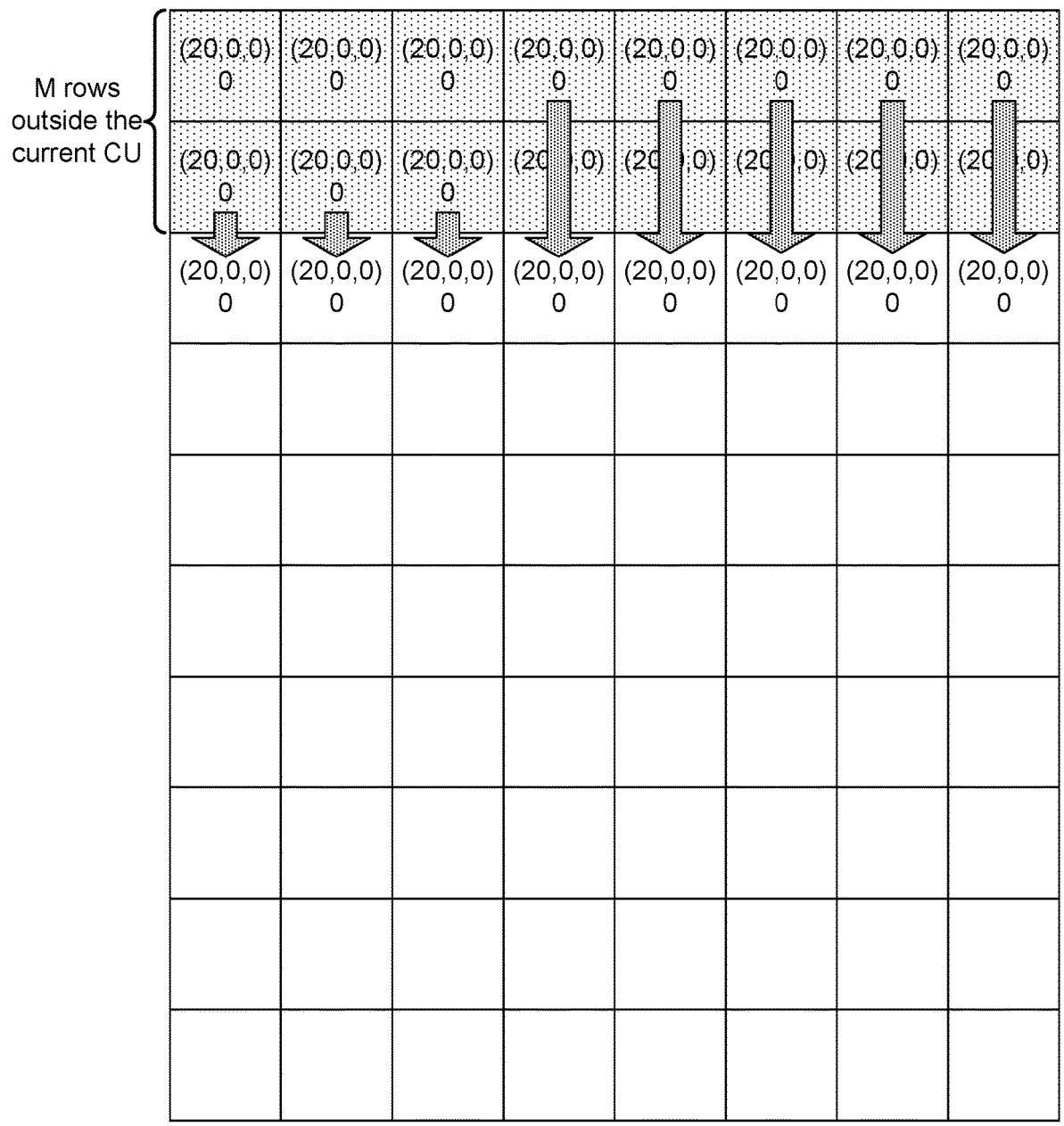
FIG. 7 illustrates an example of copy above mode for copying pixels across coding unit (CU) by padding index 0 and the corresponding pixel values.

An example illustrating an embodiment of the present invention for the decoder side is shown in FIG. 7, where the indices and pixel values of the above NCPs are all equal to 0 and the palette color in the entry zero respectively.

Figure 8:
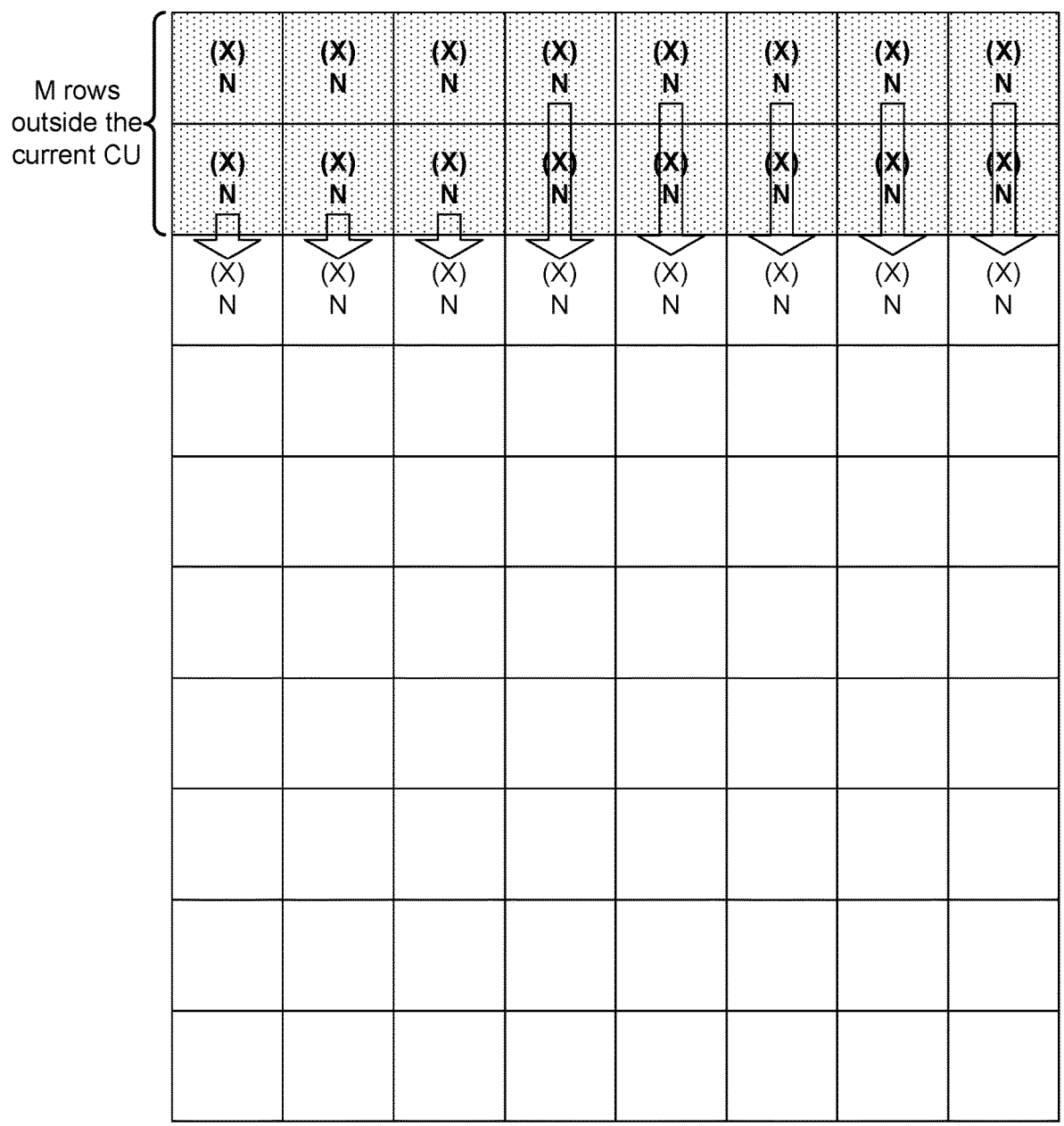
FIG. 8 illustrates an example of copy above mode for copying pixels across coding unit (CU) by padding a special index N and pixel value X.

Another example illustrating an embodiment of the present invention for the decoder side is shown in FIG. 8, where the index and pixel value of the above NCPs equal to N and a predefined or derived pixel value X respectively as shown in FIG. 8. Pixel value X can be (127, 0, 0) or (128, 0, 0) for the YUV format, or (127, 127, 127) or (128, 128, 128) for the YUV format.

In one embodiment, the encoder and decoder can substitute the above index with the most frequently occurred index and substitute the pixel value to the corresponding pixel value.

Redundant Index Removal

In SCM 2.0, if the previous run (i.e., the copy mode applied to the previous pixel) is copy above run, the current pixel ($P_c$) cannot have the same index as the index of above pixel ($P_a$) when the current pixel is the first pixel of a new index run. Otherwise, the current pixel would be merged into the previous run. In this case, the index ($I_c$) of the current pixel can be coded with redundancy removal. The index of the above pixel ($P_a$) is referred to as $I_{above}$ and the index of previous pixel (e.g, the left pixel $P_{left}$) is referred to as $I_{left}$. The previous pixel can also be the right (horizontal scan), the above or the below pixel (vertical scan) depending on the scan direction. An above pixel can be in the row above the current pixel or in the column to the left of the current pixel based on the scanning direction.

According to an embodiment of the present invention, in order to reduce line buffer requirement, if the previous pixel (e.g., the left pixel $P_{left}$) is coded using the copy above mode and $I_{above}$ is from the above CU in the horizontal scan or from the left CU in the vertical scan, the redundant index removal is disabled, so there is no need to store and access the index of the above pixel. In other words, only if the previous pixel is coded using the copy-index mode, a redundant index corresponding to the previous pixel index will be removed from the palette set to form an updated palette set for encoding or decoding the index of the current pixel. FIG. 9A illustrates the case that $I_{above}$ is directly copied from the neighboring CU. FIG. 9B illustrates the case that $I_{above}$ is copied from an above pixel, where the index of the above pixel in turn is copied from the neighboring CU.

In one embodiment, when the $P_{left}$ is coded in the copy above mode and the current pixel is in the first N rows of the current CU, the redundancy removal will be disabled.

In another embodiment, when $P_{left}$ is coded in the copy above mode, the index redundancy removal will be disabled for all indices.

In yet another embodiment, redundant index removal can be disabled for all indices, regardless of the mode of $P_{left}$.

In one embodiment, if $I_{above}$ is equal to N (from NCPs), the redundant index removal can be disabled when $P_{left}$ is coded in the copy above mode.

Subblock Scan for 64×64 Palette Coded Block

In SCM-2.0 palette mode, the traverse scanning is applied for all block sizes, which includes 64×64 block. The traverse scan of a 64×64 block is shown in FIG. 10.

In HEVC, while the coding unit (CU) can be as large as 64×64, the maximum processing unit can be only 32×32. This is because the maximum transform unit (TU) is 32×32, and a 64×64 CU coded in the Intra or Inter mode can be divided into four 32×32 blocks for parsing coefficients and reconstruction. There is no need to use a 64×64 buffer for HEVC decoding.

However, in SCM-2.0 palette mode coding, a 64×64 traverse scan is used, which requires a 64×64 buffer for encoder and decoder. Therefore, the encoder and decoder need to accommodate the processing ability of the processing unit to be able to process a 64×64 block. Consequently, it increases the implementation cost and complexity.

Figure 11A:
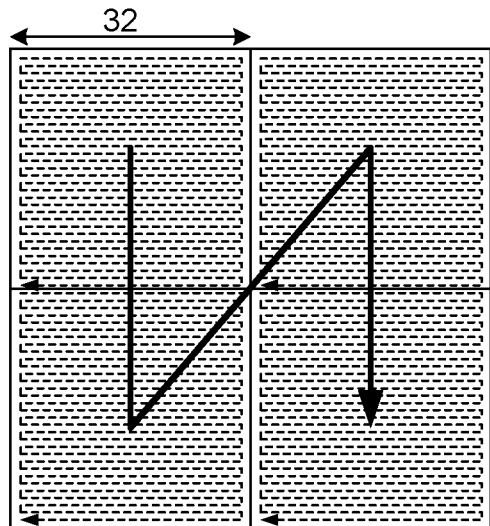
FIG. 11A illustrates an example of scanning order across the four 32×32 blocks corresponding to upper-left, lower-left, upper-right, and then lower-right as indicated by the bold zig-zag line with an arrow.
Figure 11B:
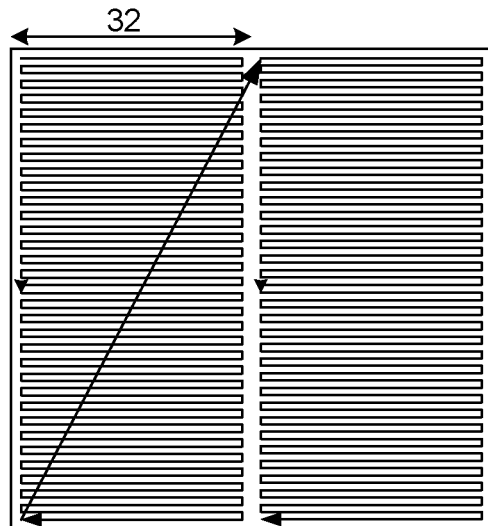
FIG. 11B illustrates a complete scan pattern corresponding to FIG. 11A across the four 32×32 blocks.
Figure 12A:
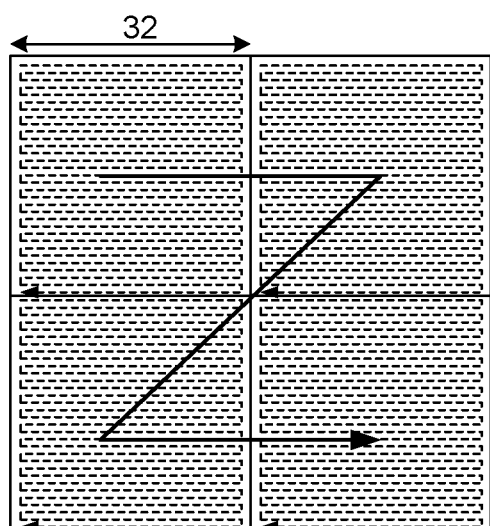
FIG. 12A illustrates an example of scanning order across the four 32×32 blocks corresponding to upper-left, upper-right, lower-left, and then lower-right as indicated by the bold zig-zag line with an arrow.
Figure 12B:
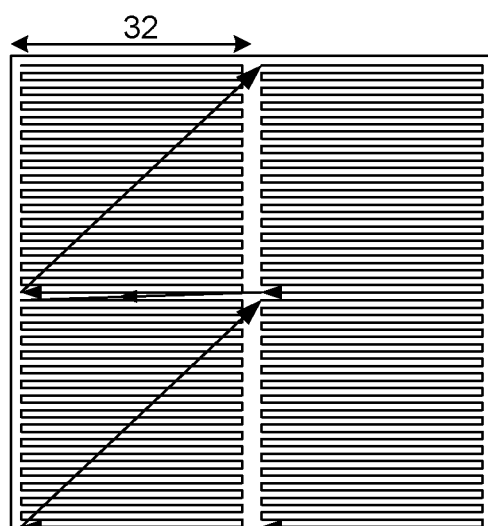
FIG. 12B illustrates a complete scan pattern corresponding to FIG. 12A across the four 32×32 blocks.

In one embodiment of the present invention, the 64×64 traverse scan is split into four 32×32 traverse scans as shown in FIGS. 11A-B and FIGS. 12A-B. According to one embodiment, a 64×64 block is divided into four 32×32 blocks and two different scan patterns across the four 32×32 blocks are shown in FIG. 11A and FIG. 12A respectively. In FIG. 11A, the scanning order across the four 32×32 blocks are upper-left, lower-left, upper-right, and then lower-tight as indicated by the bold zigzag line with an arrow. In FIG. 12A, the scanning order across the four 32×32 blocks are upper-left, upper-right, lower-left, and then lower-right as indicated by the bold zigzag line with an arrow. For each 32×32 block, a 32×32 traverse scan is applied. FIG. 11B illustrates a complete scan pattern corresponding to FIG. 11A across the four 32×32 blocks. FIG. 12B illustrates a complete scan pattern corresponding to FIG. 12A across the four 32×32 blocks. In this scan order, a 64×64 palette CU can be treated as four 32×32 blocks and fit into the processing unit with size equal to 32×32. Therefore, only a 32×32 buffer and some line buffers are required.

Figure 13A:
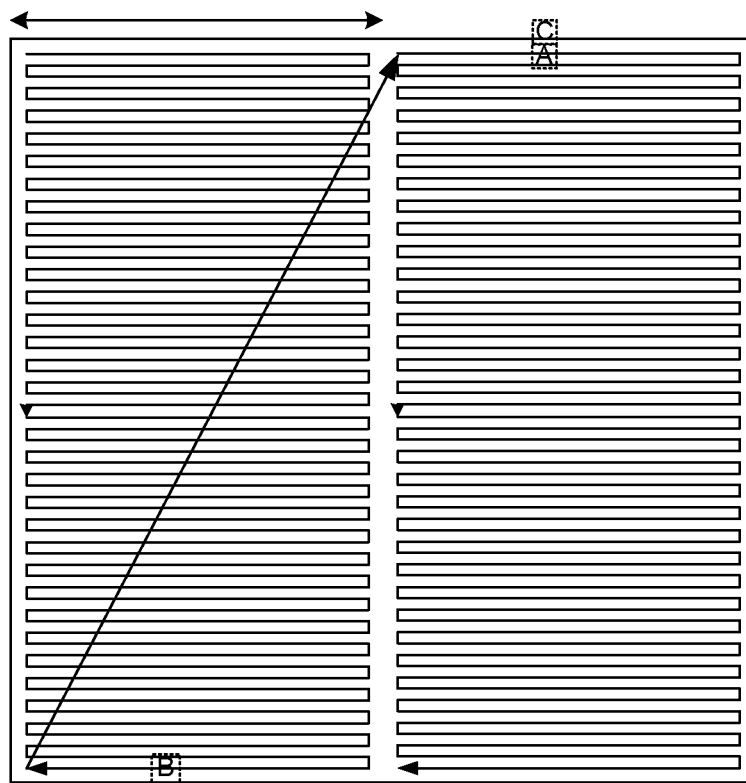
FIG. 13A illustrates an example of the above sample position derivation based on the scan order and geometry position for the scan order of FIG. 11B.
Figure 13B:
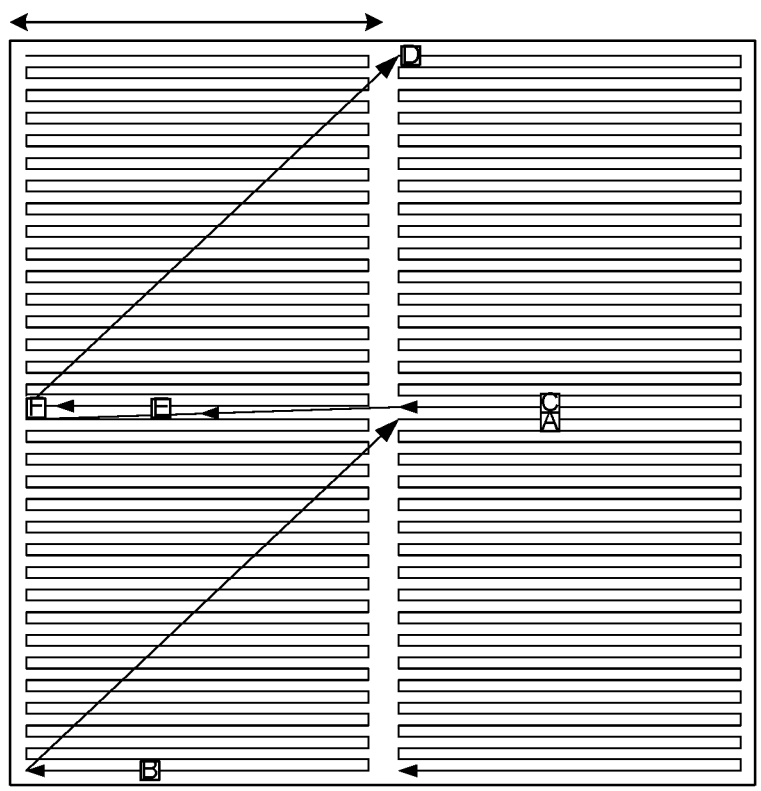
FIG. 13B illustrates an example of the above sample position derivation based on the scan order and geometry position for the scan order of FIG. 12B.

For the copy_above_run mode, the above sample position can be derived from scan order position or geometry position. If the above sample position is derived from scan order, the scan index of the above sample is equal to the current scan index minus 32. For example, for a current pixel A, if the above sample position is derived from scan order, its above sample position is pixel B. If the above sample position is derived from geometry position, its above sample position is pixel C as shown in FIGS. 13A-B, where FIG. 13A corresponds to the scan order of FIG. 11B and FIG. 13B corresponds to the scan order of FIG. 12B. Furthermore, mixed sample position derivation can be applied. For example, for the first row of the upper-right 32×32 block, it can use scan order position derivation to find its above pixel, and other rows use geometry derivation.

For a current sample, if the above sample is not available, the copy_above_run mode (also referred to as "copy-above mode") cannot be applied. For example, if the above sample position is derived from geometry position, the palette prediction mode of the first row of the upper-right 32×32 block cannot be copy_above_run mode.

The maximum number of palette run can be limited. Furthermore, the redundant index removal is not applied when the previous coded palette run mode is copy_above_run and the above sample is not available. FIG.

13B illustrates an example for this case. If the last coded palette run mode for pixel D is copy_above_run and the run starts from pixel E, the copy_above_run should be ended at pixel F. The maximum number of palette run for pixel E can be (scan_order_F−scan_order_E). The palette run mode for pixel D should be the index run mode. For pixel D, the redundant index removal is not applied because the index of its above sample is not available.

The size of sub-blocks can be aligned with the maximum transform unit (TU) size. Each sub-block scan can be independent.

Subblock Scan for 64×64 Palette Coded Block for Non-Traverse Scan

Figure 14A:
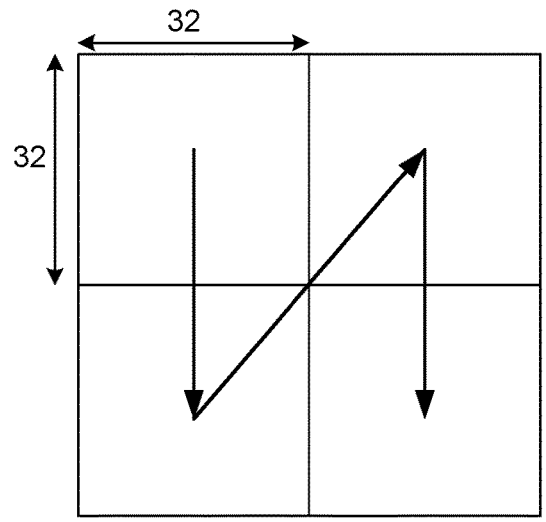
FIG. 14A illustrates an examples of the vertical-first scan order across the four 32×32 blocks.
Figure 14B:
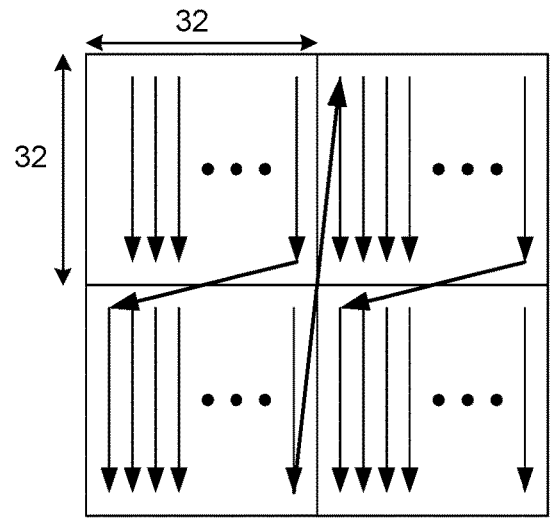
FIG. 14B illustrates an example of the vertical-first scan order across the four 32×32 blocks and vertical raster scan for each 32×32 block.
Figure 15A:
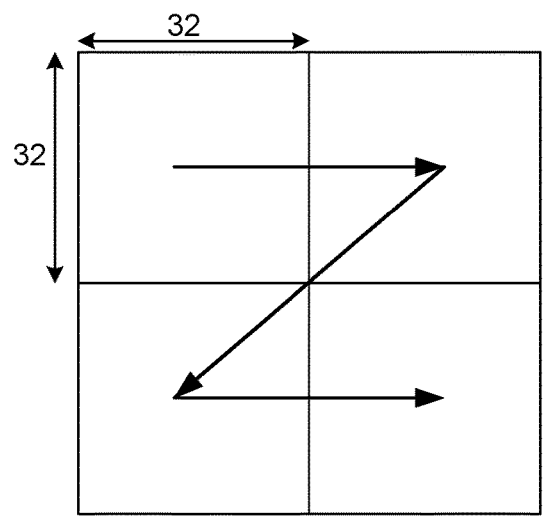
FIG. 15A illustrates an examples of the horizontal-first scan order across the four 32×32 blocks.
Figure 15B:
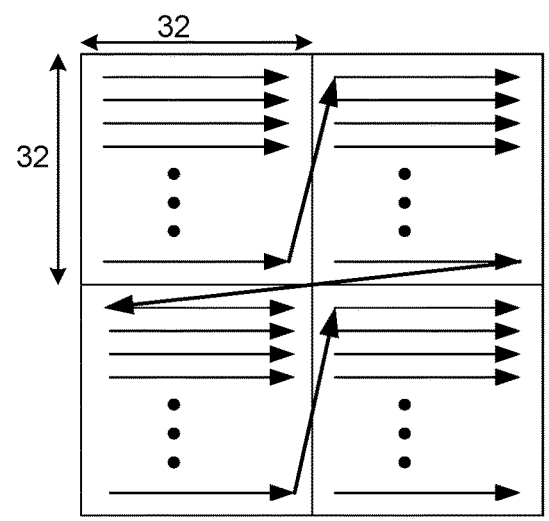
FIG. 15B illustrates an example of the horizontal-first scan order across the four 32×32 blocks and horizontal raster scan for each 32×32 block.

The subblock scan and palette predictor derivation disclosed above for the traverse scan can also be applied to the raster scan. If the raster scan is used, a 64×64 block can be also divided into four 32×32 blocks. The scan order within each 32×32 block in FIG. 11A-B, FIG. 12A-B, and FIG. 13A-B can be changed to the raster scan. The scan order across the four 32×32 blocks can be vertical first as shown in FIG. 14A or can be horizontal first as shown in FIG. 15A. In FIG. 14B, a vertical raster scan is applied within each subblock and in FIG. 15B, a horizontal raster scan is applied within each subblock.

Inferred Palette Mode Flag or Forcing CU Split for 64×64 CU for Palette Coding

To avoid irregular structure of block scanning order, palette coding can be skipped for CUs with a size larger than a pre-defined block size. In one embodiment, the pre-defined block size is 32×32. Accordingly, for a 64×64 CU, palette_mode_flag is derived as 0 without signaling. Table 3 illustrates an exemplary syntax table, where the syntax palette_mode_flag[x0][y0] is skipped is for block size 64×64 as indicated by the condition (nCbS!=64) in note (3-1).

TABLE 3

| | Note |
|---|---|
| coding_unit( x0, y0, log2CbSize ) { <br> ... <br>     nCbS = ( 1 << log2CbSize ) <br> ... <br>     if( palette_mode_enabled_flag && <br>     ChromaArrayType = =3 <br> && <br>         CuPredMode[ x0 ][ y0 ] = = MODE_INTRA && <br>         !intra_bc_flag[ x0 ][ y0 ] && nCbS != 64 ) <br>         palette_mode_flag[ x0 ][ y0 ] <br>     if( palette_mode_flag[ x0 ][ y0 ] ) <br>         palette_coding( x0, y0, nCbS ) <br>     else { <br> ... | (3-1) |

In another embodiment, when the CU size is equal to 64×64 and the palette_mode_flag is one, the current CU is divided into four 32×32 palette coded blocks. Each block may use its individual syntax for palette coding.

In yet another embodiment, an encoder constraint is imposed so that the palette_mode_flag is constrained to be 0 (i.e., palette mode off) if the CU size is equal to 64×64.

Inferred Palette_Mode_Flag for Palette Coding

In SCM 2.0 palette mode, the traverse scan is applied for all block sizes including the 64×64 block. The traverse scan of a 64×64 block is shown in FIG. 10.

To avoid irregular structure of block scanning order, palette coding can be skipped when the size of palette coded CU is larger than the maximum TU size. If the CU size is larger than the maximum TU size, palette_mode_flag is derived as 0 without signalling. Table 4 illustrates an exemplary syntax table, where the syntax palette_mode_flag[x0][y0] is skipped for the CU size larger than the maximum TU size, as indicated by the condition (log 2CbSize<=MaxTbLog 2SizeY) in note (4-1).

TABLE 4

| | Note |
|---|---|
| coding_unit( x0, y0, log2CbSize ) { | |
| ... | |
| nCbS = ( 1 << log2CbSize ) | |
| ... | |
| if( palette_mode_enabled_flag && | (4-1) |
| ChromaArrayType = = 3 && | |
| CuPredMode[ x0 ][ y0 ]= =MODE_INTRA&& | |
| !intra_bc_flag[ x0 ][ y0 ] && log2CbSize <= MaxTbLog2SizeY) | |
| palette_mode_flag[ x0 ][ y0 ] | |
| if( palette_mode_flag[ x0 ][ y0 ] ) | |
| palette_coding( x0, y0, nCbS ) | |
| else { | |
| ... | |

In another embodiment, an encoder constraint is imposed so that the palette-mode_flag is constrained to be 0 (i.e., palette mode off) if the CU size is larger than the maximum TU size.

For any CU with size no larger than the pre-defined block size (e.g., the maximum TU size or 32×32), if it is coded by the palette coding mode, techniques described in this disclosure (such as palette size signaling, restricting maximum coding unit size, simplified context-adaptive coding for run type, and simplified redundancy removal in palette coding) can be applied.

Context of Run_Type

Another aspect of the present invention addresses contexts for run type coding. For example, run_type (also referred to as "palette run type") can be coded with one fixed context as shown in Table 5. In this case, only one context is used and the context does not depend on anything.

TABLE 5

| | binIdx | | | | | |
|---|---|---|---|---|---|---|
| Syntax element | 0 | 1 | 2 | 3 | 4 | >=5 |
| palette_run_type_flag | 0 | na | na | na | na | na |

In another embodiment, run_type can be context coded using one syntax corresponding to the run_type of the pixel above as shown in Table 6, where bin index 0 is coded using context adaptive coding and other bin indices are not. There are two possible values (i.e., two contexts) for the run_type and one context model is used for each of the two the run_type values.

TABLE 6

| | binIdx | | | | | |
|---|---|---|---|---|---|---|
| Syntax element | 0 | 1 | 2 | 3 | 4 | >=5 |
| palette_run_type_flag | 0, 1 | na | na | na | na | na |

In the HEVC standard, the blocks within a coding tree block (CTB) are processed according to a z-scan pattern to match with the quadtree partition CTB into blocks. The pixel (xNbA, yNbA) indicates the pixel above the current pixel. The variable available A indicates that the pixel (xNbA, yNbA) is included in the current CTB. Table 7 illustrates an exemplary condition to determine ctxInc for palette_run_type_flag. When condA indicates the run type of the above pixel is 0, ctxInc is 0. When the (xNbA, yNbA) is not included in the current CTB, ctxInc is 0.

TABLE 7

| Syntax element | condL | condA | ctxInc |
|---|---|---|---|
| palette_run_type_flag [x0][y0] | na | palette_run_type_flag [ xNbA ][ yNbA ] | ( condA && availableA ) |

The location (xNbA, yNbA) of the above pixel is set equal to (xA, yA) for the current pixel at (x0, y0), where:
xA=x0, yA=y0−1 when the scan order is horizontal
xA=x0−1, yA=y0 when the scan order is vertical in another embodiment, run_type can be context coded using one syntax corresponding to the run_type of the previous pixel as shown in Table 8, where bin index 0 is coded using context adaptive coding and other bin indices are not. Again, there are two possible values (i.e., two contexts) for the run_type and one context model is used for each of the two the run_type values.

TABLE 8

| | binIdx | | | | | |
|---|---|---|---|---|---|---|
| Syntax element | 0 | 1 | 2 | 3 | 4 | >=5 |
| palette_run_type_flag | 0, 1 | na | na | na | na | na |

The location (xNbB, yNbB) of the previous pixel is set equal to (xB, yB) for the current pixel at (x0, y0), where:
xB=x0−1, yB=y0 when the scan order is horizontal traverse, y0 is even,
xB=x0+1, yB=y0 when the scan order is horizontal traverse, y0 is odd,
xB=x0, yB=y0−1 when the scan order is vertical traverse, x0 is even, and
xB=x0, yB=y0+1 when the scan order is vertical traverse, x0 is even.

If the scan order is not traverse, location (xB, yB) is determined according to:
xB=x0−1, yB=y0 when the scan order is horizontal, and
xB=x0, yB=y0−1 when the scan order is vertical.

The variable available B indicates the pixel (xNbB, yNbB) is included in the current CTB. Table 9 illustrates an exemplary condition to determine ctxInc for palette_run_type_flag. When condL indicates the run type of the previous pixel is 0, ctxInc is 0. When the (xNbB, yNbB) is not included in the current CTB, ctxInc is 0.

TABLE 9

| Syntax element | condL | condA | ctxInc |
|---|---|---|---|
| palette_run_type_flag [ x0 ][ y0 ] | palette_run_type_flag [ xNbB ][ yNbB ] | na | ( condL && available B ) |

Temporal Merge Candidate for IntraBC

In HEVC Merge mode, temporal Merge candidate is used as one of the Merge candidate. In temporal Merge candidate derivation, a target reference picture of the current picture in List_0 is first specified. The target reference picture of the current picture is the picture with reference picture index (ref_Idx) equal to 0 in List_0. Then the motion vector of the collocated PU is scaled to derive the temporal Merge candidate. The ref_Idx of temporal Merge candidate is set equal to zero. For a B-slice, two motion vectors, one is for reference picture list 0 and the other is for reference picture list 1, are obtained and combined to make the bi-predictive Merge candidate.

However, in temporal Merge candidate derivation, if the target reference picture of the current picture or the reference picture of the collocated picture is long-term reference frame, the MV scaling is disabled. And if only one of these two pictures is a long-term reference frame, the temporal Merge candidate is designated as unavailable.

In one embodiment for the IntraBC design, the reconstructed current picture is used as one of the reference pictures for the current picture. This reconstructed current picture is inserted into the reference frame list, such as the last reference picture in List_0. Therefore, the IntraBC mode can be treated as one of the Inter modes. However, the reference picture points to this reconstructed current picture. The block vector (BV) of the IntraBC block is treated as the MV that points to this reconstructed current picture. In such IntraBC design, the reconstructed current picture is marked as long-term reference picture.

In the IntraBC design mentioned above, the BV cannot be used to derive the temporal Merge candidate because if the collocated block is coded as IntraBC mode, the reference picture of the collocated block is a long-term picture. If the reference picture of the current picture is a short-term picture, the temporal Merge candidate is not available. This implies that a BV cannot be derived using temporal Merge candidate derivation.

To overcome the issue mentioned above, an embodiment according to the present invention allows the BV to be used in temporal Merge candidate derivation. In temporal Merge candidate derivation, if the MV of the collocated block is a BV, the BV is used as the temporal Merge candidate. The temporal Merge candidate is available if the current reconstructed picture exists in the current reference frame list. The reference picture index, ref_Idx of the temporal Merge candidate is set equal to the reference picture index that points to the current reconstructed picture.

For example, if the current reconstructed picture is inserted in List_0 during temporal Merge candidate derivation for List_0 MV and if the MV of the collocated PU is BV, the BV is used as the List_0 MV for this temporal Merge candidate and the ref_Idx is set equal to the reference picture index that points to the current reconstructed picture.

Line-Constrained Run-Coding for Palette Index

To better facilitate pipeline friendliness, an embodiment of the present invention utilizes line-constrained run-coding for the palette index, which has four methods (modes) to code a line of palette index:

Line copy_index: All samples in the line have the same palette index.

Line copy_above: All indices of the line are copied from the line above.

Line fraction copy_index: The indices of the line are coded only using index_run. Each run is a repeat of a specific index. The last run terminates at the end of the line.

Line fraction mixture: The indices of the line are coded using index_run and copy_above. Each run is either a repeat of a specific index (copy_index) or a copy of consecutive indices from above line (copy_above). The last run terminates at the end of the line.

For each of the four methods, the runs always terminate at the end of the line, achieving pipeline friendliness. This also eliminated the need of using traverse scan.

In the following, examples are illustrated for signaling line-constrained run-coding incorporating an embodiment of the present invention.

Example 1. In this example, syntax design first determines whether it is "line copy_above" mode. If not, further syntax elements will determine a single run (line copy_index) or multiple runs (line fraction) modes. Table 10 below summarizes the syntax design.

TABLE 10

|  | Run_type_line | Full_line_flag | Remaining syntax |
| --- | --- | --- | --- |
| Line copy_above | 0 |  | (If necessary) Escape values |
| Line copy_index | 1 | 1 | palette_index, (If necessary) Escape values |
| Line fraction | 1 | 0 | Loop over runs: Run_type_fraction If copy_above: run, (if necessary) Escape values If copy_index: palette_index, run, (if necessary) Escape values |

For both "line copy_above mode" and "line copy_index" mode, the palette run does not need to be signaled since the run length is equal to the block width (or height if the scan is vertical).

For "line fraction modes", since the last run has to be terminated at the end of the line, its length can be coded efficiently with a special "run-to-the-end" syntax design or by signaling number_of_run_in_line. Therefore, the run length of the last run can be skipped.

Figure 16:
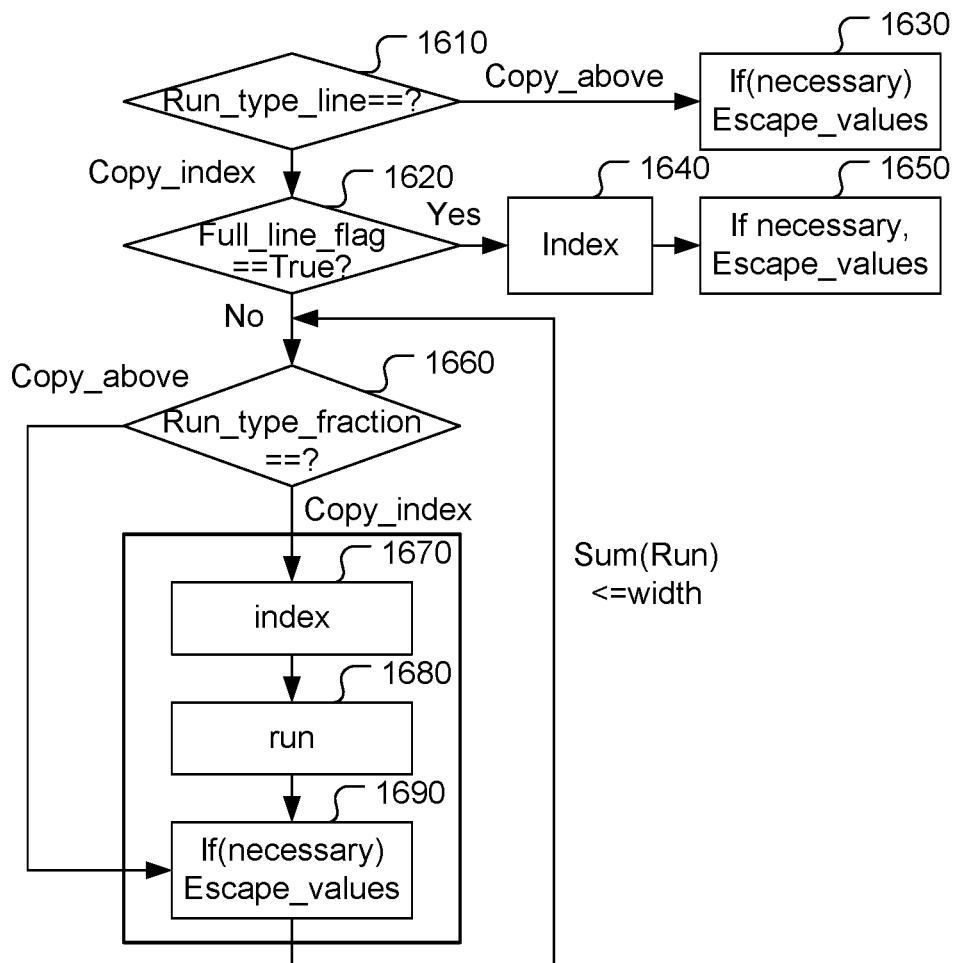
FIG. 16 illustrates an exemplary flowchart of syntax parsing incorporating the syntax design according to an embodiment of the present invention.

FIG. 16 illustrates an exemplary flowchart of syntax parsing incorporating the syntax design as disclosed above. As shown in FIG. 16, the Run_type_line is checked as shown in step 1610. If the run type is Copy_index, the process goes to step 1620 and if the run type is Copy_above, step 1630 is performed. In step 1620, the Full_line_flag is checked to determine whether it is true. If it is true (i.e., the "Yes" path), the index is parsed as shown in step 1640 and Escape_values is further parsed if necessary as shown on step 1650. If Full_line_flag is not true (i.e., the "No" path), step 1660 is performed, which checks syntax Run_type_fraction. If Run type_fraction is Copy_above, step 1690 is performed. If Run_type_fraction is Copy_index, step 1670 is performed, where an index is parsed. A run is parsed in step 1680 after step 1670. After the run is parsed, the Escape_values is parsed in step 1690 if necessary.

The above embodiment does not distinguish between "Line fraction copy_index" and "Line fraction mixture". It allows both scenarios by simply signaling Run_type_fraction at the beginning of each run within a given line.

Example 2. In this example, syntax design first determines whether it is "line copy_above" mode. If not, further syntax elements will determine single run (line copy_index) or multiple runs (line fraction) modes. Table 11 summarizes the syntax design.

TABLE 11

|  | Run_type_line | Full_line_flag | Copy_index_only | Remaining syntax |
|---|---|---|---|---|
| Line copy_above | 0 |  |  | (If necessary) Escape values |
| Line copy_index | 1 | 1 |  | palette_index, (If necessary) Escape values |
| Line fraction Copy_index | 1 | 0 | 1 | Loop over runs: palette_index, run, (if necessary) Escape values |
| Line fraction mixture | 1 | 0 | 0 | Loop over runs: Run_type_fraction If copy_above: run, (if necessary) Escape values If copy_index: palette_index, run, (if necessary) Escape values |

As compared to example 1, a flag Copy_index_only is used to indicate Line fraction copy_index, where the loop over runs does not need to signal the run type since they are all copy_index runs.

For "line fraction modes", since the last run has to be terminated at the end of the line, its length can be coded efficiently with a special "run-to-the-end" syntax design or by signaling number_of_run_in_line. The run length of the last run can be skipped.

Other binarization examples. More examples of binarization signaling of the four modes are illustrated in Tables 12A-J, where variable length binarization is illustrated in Tables 12A-I and fixed length binarization is illustrated in Tables 12J.

TABLE 12A

|  | Run_type_line | Fraction_line_flag |
|---|---|---|
| Line copy_above | 0 |  |
| Line copy_index | 1 | 0 |
| Line fraction | 1 | 1 |

TABLE 12B

|  | Run_type_line | Fraction_line_flag |
|---|---|---|
| Line fraction | 0 |  |
| Line copy_index | 1 | 0 |
| Line copy_above | 1 | 1 |

TABLE 12C

|  | Run_type_line | Fraction_line_flag |
|---|---|---|
| Line copy_index | 0 |  |
| Line fraction | 1 | 0 |
| Line copy_above | 1 | 1 |

TABLE 12D

|  | Run_type_line | Fraction_line_flag | Copy_index_only |
|---|---|---|---|
| Line copy_above | 0 |  |  |
| Line copy_index | 1 | 0 |  |
| Line fraction copy_index | 1 | 1 | 1 |
| Line fraction mixture | 1 | 1 | 0 |

TABLE 12E

|  | Run_type_line | Fraction_line_flag |
|---|---|---|
| Line copy_above | 1 |  |
| Line copy_index | 0 | 0 |
| Line fraction | 0 | 1 |

TABLE 12F

|  | Run_type_line | Fraction_line_flag |
|---|---|---|
| Line fraction | 1 |  |
| Line copy_index | 0 | 0 |
| Line copy_above | 0 | 1 |

TABLE 12G

|  | Run_type_line | Fraction_line_flag |
|---|---|---|
| Line copy_index | 1 |  |
| Line fraction | 0 | 0 |
| Line copy_above | 0 | 1 |

TABLE 12H

|  | Run_type_line | Fraction_line_flag | Copy_index_only |
|---|---|---|---|
| Line copy_above | 1 |  |  |
| Line copy_index | 0 | 0 |  |
| Line fraction copy_index | 0 | 1 | 1 |
| Line fraction mixture | 0 | 1 | 0 |

TABLE 12I

|  | Example | Example | Example |
|---|---|---|---|
| Line copy_above | 0 | 10 | 111 |
| Line copy_index | 111 | 110 | 110 |
| Line fraction copy_index | 110 | 111 | 10 |
| Line fraction mixture | 10 | 0 | 0 |

TABLE 12J

|  | Example |
|---|---|
| Line copy_above | 00 |
| Line copy_index | 01 |
| Line fraction copy_index | 10 |
| Line fraction mixture | 11 |

Context coding examples. Each of the bins in the above binarization examples can be coded using the bypass or the regular context mode. The context coding can depend on the previous mode, the mode in the line above, or both. If context coded, the Run_type_line and Run_type_fraction may share the same context, or they can use different contexts.

Coding of the Last Run in a Line

Since the last run in each line has to be terminated at the end of the line, its length can be coded efficiently with a special "run-to-the-end" syntax design. For example, a specific code can be assigned as the run-to-the-end code in the palette binarization table. In another example, a syntax number_of_run_in_line corresponding to the number of runs in the line can be signaled. When parsing the loop over runs in a line, the run length of the last run can be skipped.

In yet another embodiment, a syntax last_run flag is signaled for each run. When this flag is 1, the run does not need to be signaled.

Coding of the Run

The present invention is not limited to the specific binarization methods for coding the runs. Other run coding method such as the truncated unary or truncated binary can be used to binarize the run.

Since the run is needed only for "Line fraction" modes with run length limited to be shorter than the block width (or height), fixed-length coding can also be used.

For a given binarization of the run, each bin can be coded in the bypass or the regular context mode.

Coding of the First Index of each Line

Figure 17:
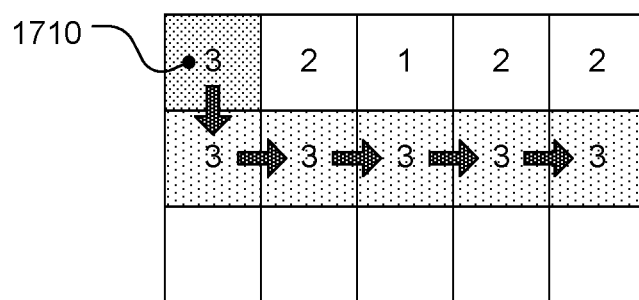
FIG. 17 illustrates an example of coding the first index of each line according to an embodiment of the present invention.

For each line after signaling the current line is coded as full line or partial line, the index of the line is signaled. If the index is the same as the one above, one flag can be signaled instead of the index itself. In the example shown in FIG. 17, for the line with all indices 3, index '3' can be signaled. Also a flag indicating that the index is the same as the above pixel (1710) can be signaled.

FIG. 18 illustrates an exemplary flowchart of syntax parsing incorporating the syntax design as disclosed above. The flowchart in FIG. 18 is similar to that in FIG. 16 except for the case that the Full_line_flag is true. In this case, additional test regarding whether Copy_index_from_above is true in step 1810. If the result is "Yes", step 1830 is performed where Escape_values is parsed if necessary. If the result is "No", step 1820 is performed where an index is parsed. After step 1820, Escape_values is parsed if necessary as shown in step 1830.

If the current line is not coded as a full line, the flag can be used to indicate that the index is same as the one above instead of signaling index itself. Two examples are shown in FIGS. 19A-B, where the flag indicates that index "3" from the pixel above (1910) is used in FIG. 19A and index "1" from the pixel above (1920) is used in FIG. 19B.

Figure 20:
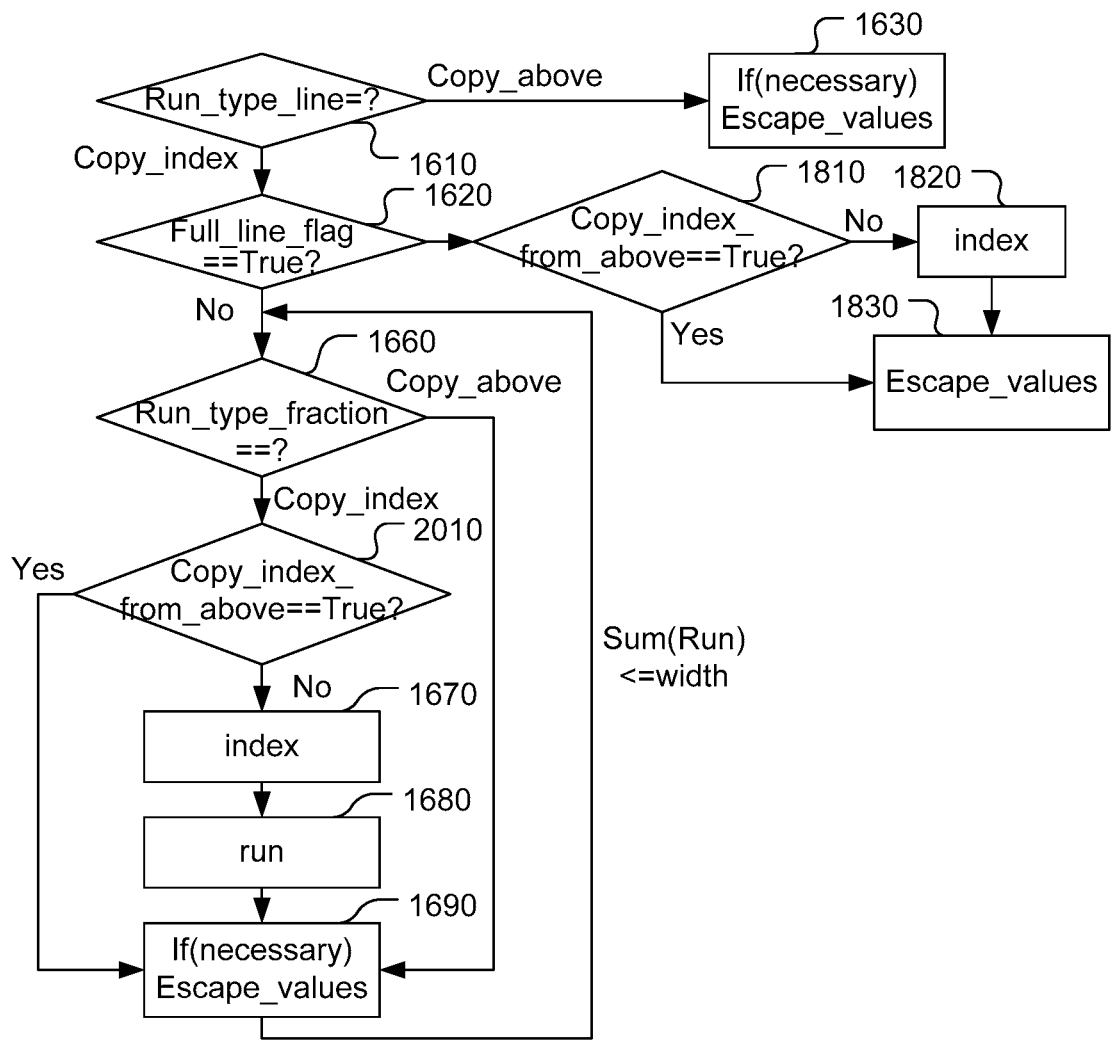
FIG. 20 illustrates yet another exemplary flowchart of syntax parsing incorporating the syntax design according to an embodiment of the present invention.

FIG. 20 illustrates an exemplary flowchart of syntax parsing incorporating the syntax design as disclosed above. FIG. 20 is similar to FIG. 18 except that an additional step (2010) is included between step 1660 and step 1670. In step 2010, whether Copy_index_from_above is true is tested. If the result is "Yes", Escape_values is parsed if necessary as shown in step 1690. If the result is "No", an index is parsed as shown in step 1670.

Entire Row Run

In order to improve coding efficiency, an embodiment is disclosed for coding matching length corresponding to the entire row in the color index coding. A row_run_flag is signaled in this case. Table 13A illustrates an example of binarization for signaling of row_run_length according to an embodiment of the present invention. If row_run_flag=1, this line is a row run, the copy is from the copy position to the end of the row. If row_run_flag=0, a length syntax is further signaled following row_run_flag.

The above embodiment for entire row run can also be applied to copy above, copy left, copy other direction, transition copy, arbitrary copy or any combination of thereof. For example, the above entire row run technique can be applied to the copy above or copy left mode, but not transition copy or arbitrary copy. Tables 13B-C illustrate two examples of binarization for signaling of row_run_length according to an embodiment of the present invention

TABLE 13A

| codeword | Mode |
| --- | --- |
| 0 | Row run |
| 1 | Other run |

TABLE 13B

| codeword | Mode |
| --- | --- |
| 00 | Copy above entire row run |
| 01 | Copy above other run |
| 10 | Copy index entire row run |
| 11 | Copy index other run |

TABLE 13C

| codeword | Mode |
| --- | --- |
| 0 | Coy above entire row run |
| 10 | Copy above other run |
| 110 | Copy index entire row run |
| 111 | Copy index other run |

The above examples illustrate entire row run for different palette prediction modes. These examples are not meant for exhaustive listing of all possible binarization and palette prediction modes.

Arbitrary Position Copy

In addition to the copy-above and copy-left to encode index map, an embodiment of the present invention includes the arbitrary position copy mode to facilitate copying length-of-indices from other location.

Transition copy is a coding mode developed for the screen content coding under HEVC. Different from transition copy, the current pixel arbitrary copy mode is not determined by the left pixel. The encoder will search in the previous coded color indexes to find a matched color index with current color index. The distance is the distance between these two color index positions. The length is derived according to the number of pixels that has the same color index as the pixel at the specified distance. The distance and length pair is determined by the longest length or by other rate-distortion optimization (RDO) decisions.

Figure 21:
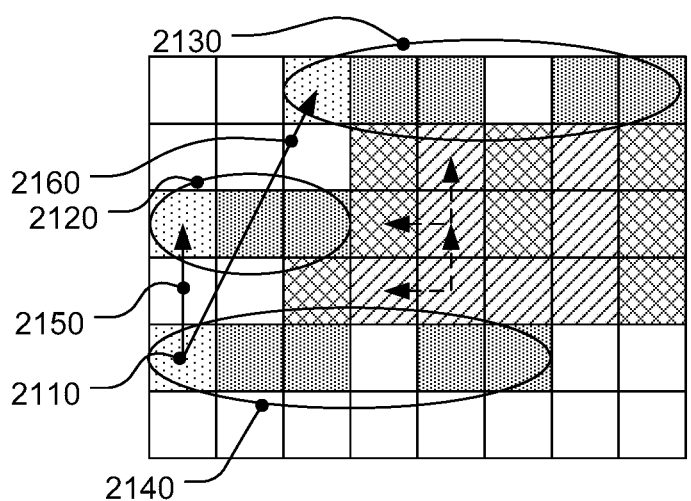
FIG. 21 illustrates an example of arbitrary copy mode according to an embodiment of the present invention.

Additional syntax element is added in order to indicate the usage of arbitrary copy. If arbitrary copy mode is used, then the syntax elements arbitrary_copy_run_distance and arbitrary_copy_run_length (e.g. n) will be parsed, such that the following n sample indices are directly copied from the location specified by arbitrary_copy_run_distance. FIG. 21 illustrates an example of arbitrary copy mode. When encoding a current pixel (2110), the encoder will search in the previous coded pixels. Two matched pairs with lengths 3 and 6 are found as indicated by ellipses 2120 and 2130 with the current pattern (2140) in FIG. 21. The locations of the matched pairs can be identified by the respective block vectors (2150 and 2160). The encoder will choose one according to the RDO decision or longest length.

The arbitrary_copy_run_distance can be signaled as a vector or two separate 1D scalar values.

TU Based Palette Coding

Index map coding of palette coding can also be applied to each TU. The information of palette itself can be shared by all TUs within a CU. Maximum TU split depth can be fixed as N such as max_transform_hierarchy_depth_intra-1.

TU split depth can be fixed as N (e.g. 1) for larger CUs such as a 64×64 CU and fixed as N−1 (e.g. 0) for smaller CUs such as 32×32, 16×16 and 8×8.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Subsampled Color Index Map Coding

In JCTVC-O0218 and JCTVC-O0182, the horizontal raster scan is used for color index map coding. In one embodiment of the present invention, the subsampled index map is encoded and other parts of the index map are then encoded or directly filled. For example, the even-numbered sample rows or even-numbered sample columns can be encoded first by using the original palette color index map coding. For the rest samples, the interpolation can be applied to fill the samples. Alternatively, a syntax can be signaled for the rest sample rows or columns. For example, for each row, a prediction mode can be signaled. The prediction mode may include vertical mode, horizontal mode, interpolation mode, and normal coding mode. For the interpolation mode, the samples are interpolated by using the neighboring pixels.

A CU-level flag can be signaled to indicate whether the subsampled color index map is used for the CU. A flag in PPS/SPS/Slice header can be signaled to turn on/off for this tool.

Run Coding of Single Palette Index CU

In SCM 2.0, if a CU contains only one possible palette index, the palette_transpose_flag and run coding will be skipped. There may occur in two cases:

Case 1: CU with one palette color and no escape index, and

Case 2: CU with no palette color and one escape index.

However, when copy pixel across CU is utilized for palette coding, it is possible that even though the current palette CU has only one index, some pixels in the CU are copied from across CU and is not represented by the current palette or Escape. To allow such cases, the palette_transpose_flag and run coding can be adaptively signalled for a CU containing only one possible index. For example, in Case 1, when the CU has one palette color and no escape index,signaling of palette_transpose_flag and/or run coding is enabled. If palette_transpose_flag is skipped, it can be inferred as on or off. For Case 2, when the CU has no palette color and one escape index, the signaling of palette_transpose_flag and/or run coding is enabled. If palette_transpose_flag is skipped, it can be inferred as on or off.

According to another embodiment, any combination of disabling the palette_transpose_flag, and run coding in Case 1, Case 2 or both cases can be applied.

Offset Coding of Palette Size Smaller than N

In one embodiment, when a generalized copy above mode is used, the offset of generalized copy above mode can be inferred by the palette size. When the palette size is smaller than N and the index mode is the copy above mode, the offset is inferred to be M (e.g. M=1) and the encoder and decoder do not need to signal the offset for copy above mode. When palette size is larger than N, the copy above multiple row is used.

In one embodiment, the encoder and decoder will always signal the offset for copy above mode.

Use Palette Syntax to Code Predictor Refinement Information

The palette coding method can be used as another residual coding method (e. g. coding predictor refinement information). In HEVC, after Intra or Inter prediction, the residual will be signaled to refine the predictor. In one embodiment of the present invention, instead of using residual coding syntax in HEVC, a palette coding syntax is used to signal predictor refinement information (i.e., residual). Examples according to this embodiment are described as follows:

Example 1. When the encoder uses the palette syntax to encode predictor refinement information, the encode uses palette to encode residual signal. In other words, the decoder decodes palette index and gets the values in the palette corresponding to the palette index. The value is residual value and used to refine the predictor. A special index can be reserve for residual equal to 0. For example, the reserved index can be 0 or 1.

Example 2. When the encoder uses palette syntax to encode predictor refinement information, the encode uses palette to encode original pixel values, but reserve a special index to indicate the reconstructed pixel being equal to the predictor. When the decoder decodes a palette syntax, if the index of a pixel is 0, the reconstructed pixel value is equal to the (Intra or Inter) predictor. Otherwise, the reconstructed pixel value is equal to the color in the palette corresponding to the index. For example, the reserved index can be 0 or 1.

The HEVC residual syntax can be signaled after or before the new palette syntax. In other words, there can be two stage predictor refinements: one for HEVC residual coding and one for the new palette coding.

Reset of Last Coded BVs

In SCM 2.0, the last coded BVs are used in BV predictor (BVP) derivation for BV coding. The last coded BVs are reset to (0, 0) for each CTU.

According to one embodiment of the present invention, the reset mechanism is modified to reset the last coded BVs for each CTU to a predefined value instead of (0, 0). The predefined value can be (−8, 0), (−16, 0), (−32, 0), (−64, 0), (0, −8), (0, −16), (0, −32), (0, −64).

If two last coded BVs need to be reset, the predefined BVs pairs can be {(−64, 0), (−32, 0)}, {(−32, 0), (−64, 0)}, {(−128, 0), (−64, 0)}, {(−64, 0), (−128, 0)}, {(−32, 0), (−16, 0)}, {(−16, 0), (−32, 0)}, {(−16, 0), (−8, 0)}, {(−8, 0), (−16, 0)}, {(−32, 0), (−8, 0)}, or {(−8, 0), (−32, 0)}.

With the proposed method, the BV predictor derivation can be simplified. The availability check for last coded BV (i.e., checking whether the last coded BV is equal to (0, 0)) can be skipped. Examples of reset mechanism according to this embodiment are described as follows:

Example 1. The last coded BVs are reset to (−2w, 0) and (−w, 0) when the current block is the first coded IntraBC PU in the current CTU, where the w is the PU width or PU height.

Example 2. The last coded BVs are reset to predefined values at the beginning of each CTU, where these predefined values are related to CTU_width or CTU_height. For example, the predefined values can be (−CTU_width, 0), (−(CTU_width>>1), 0), (−(CTU_width>>2), 0), (−(CTU_width>>3), 0). A minimum/maximum value constraint can be applied on these predefined values. For example, the maximum value of each component cannot be larger than −8. Therefore, the predefined values can be (max(−8, −CTU_width)), 0), (max(−8, −(CTU_width>>1)), 0), (max(−8, −(CTU_width>>2)), 0), (max(−8, −(CTU_width>>3)), 0).

Example 3. The last coded BVs are reset to predefined values at the beginning of each CTU, where these predefined values are related to min_CU_width or min_CU_height. For example, the predefined values can be (−min_CU_width), 0), (−2*min_CU_width), 0), (−3*min_CU_width, 0), (−4*min_CU_width, 0), (−8*min_CU_width, 0). A minimum/maximum value constraint can be applied on these predefined values. For example, the minimum value of each component cannot be larger than −64. Therefore, the predefined values can be (min(−64, −min_CU_width)), 0), (min(−64, −2*min_CU_width)), 0), (min(−64, −3*min_CU_width)), 0), (min(−64, −4*min_CU_width)), 0), (min(−64, −8*min_CU_width)), 0).

If two last coded BVs need to be reset, the predefined BVs pairs can be {(−min_CU_width), 0), (−2*min_CU_width), 0)}, {(−2*min_CU_width), 0), (−min_CU_width), 0)}, {(−2*min_CU_width), 0), (−4*min_CU_width), 0)}, or {(−4*min_CU_width), 0), (−2*min_CU_width), 0)}.

According to the above embodiment, the last coded BV resetting can be simplified. It won't need to detect whether the current block is the first IntraBC coded block in current CTU.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a block of video data using palette coding for a video coding system, the method comprising:
   receiving input data associated with a current block;
   determining a current palette table for the current block;
   determining a palette predictor for coding the current palette table;
   determining a palette related size corresponding to one or a combination of a reused major color size representing a first number of major colors in the current palette table that reuse major colors in the palette predictor, a new major color size representing a second number of major colors in the current palette table not predicted by the palette predictor, and a total major color size representing a third number of major colors present in the current block;
   binarizing the palette related size to generate a binarized palette related size according to one Kth order Exp-Golomb code, one unary code plus one Kth order Exp-Golomb code or one truncated unary code plus one Kth order Exp-Golomb code; and
   applying entropy coding to the binarized palette related size to generate a coded palette related size.

2. The method of claim 1, wherein K corresponds to 0, 1, 2 or 3.

3. The method of claim 1, wherein a maximum number of bits of said one truncated unary code corresponds to 1, 2 or 3.

4. The method of claim 1, wherein a part of bins of the binarized palette related size is coded using context adaptive coding.

5. The method of claim 1, wherein the palette related size corresponds to the reused major color size, and first N bits corresponding to first N reuse flags are encoded to reduce the first number of major colors in the current palette table, wherein N is a positive integer.

6. The method of claim 1, wherein said binarizing the palette related size to generate the binarized palette related size is performed adaptively according to a maximum possible palette size.

7. A method of decoding a block of video data coded using palette coding for a video coding system, the method comprising:
   receiving an input coded bitstream including compressed data of a current block;
   recovering a binarized palette related size of a current palette table from the input coded bitstream;
   recovering a palette related size by applying one Kth order Exp-Golomb code, one unary code plus one Kth order Exp-Golomb code, or one truncated unary code plus one Kth order Exp-Golomb code to the binarized palette related size, wherein the palette related size corresponds to one or a combination of a reused major color size representing a first number of major colors in the current palette table that reuse major colors in a palette predictor, a new major color size representing a second number of major colors in the current palette table not predicted by the palette predictor, and a total major color size representing a third number of major colors present in the current block; and
   recovering the current palette table for the current block based on the palette predictor and palette information including the palette related size.

8. The method of claim 7, wherein K corresponds to 0, 1, 2 or 3.

9. A method of coding a block of video data using palette coding for a video coding system, the method comprising:
   receiving input data associated with a current coding unit having a current block size;
   determining whether a palette mode flag, indicates that the current coding unit is coded according to a palette coding mode and determining whether the current block size is larger than a pre-defined block size;
   in a case that he palette mode flag indicates that the current coding unit is coded according to the palette coding mode and the current block size is determined as larger than the pre-defined block size, performing coding of each one of sub-blocks of the current block according to the palette coding mode, respectively, the current coding unit being divided into the sub-blocks each having a size that corresponds to the pre-defined block size; and
   in a case that the palette mode flag indicates that the current coding unit is coded according to the palette coding mode and the current block size is determined as equal to or smaller than the pre-defined block size, performing coding of the current coding unit according to the palette coding mode.

10. The method of claim 9, wherein at least one of a height and a width of each one of the sub-blocks corresponds to the pre-defined block size.

11. The method of claim 9, wherein a scan order of the sub-blocks is from left to right, and from top to down.

12. The method of claim 9, wherein a traverse scan is applied within each one of the sub-blocks.

* * * * *